United States Patent [19]

Konishi et al.

[11] Patent Number: 5,790,192

[45] Date of Patent: Aug. 4, 1998

[54] IMAGE-TAKING APPARATUS CHANGING THE SIZE OF AN IMAGE RECEIVING AREA BASED ON A DETECTED VISUAL AXIS

[75] Inventors: Kazuki Konishi, Tokyo; Kazuyuki Maeda, Yokohama, both of Japan

[73] Assignee: Canon Kabushiki Kaisha, Tokyo, Japan

[21] Appl. No.: 715,837

[22] Filed: Sep. 24, 1996

Related U.S. Application Data

[63] Continuation of Ser. No. 229,626, Apr. 19, 1994, abandoned.

[30] Foreign Application Priority Data

| Apr. 22, 1993 | [JP] | Japan | 5-117641 |
| Apr. 22, 1993 | [JP] | Japan | 5-117642 |
| Nov. 25, 1993 | [JP] | Japan | 5-295391 |
| Dec. 6, 1993 | [JP] | Japan | 5-305307 |

[51] Int. Cl.$^6$ ............................ H04N 5/232
[52] U.S. Cl. ............................ 348/334; 348/36
[58] Field of Search ............... 348/333, 334, 348/36, 335; 396/51; H04N 5/232

[56] References Cited

U.S. PATENT DOCUMENTS 5,245,381  9/1993  Takagi et al. ............... 354/249 X
5,257,055  10/1993  Cho et al.
5,365,302  11/1994  Kodama ............... 354/222 X

FOREIGN PATENT DOCUMENTS

| 63-94232 | 4/1988 | Japan | |
| 1-241511 | 9/1989 | Japan | G02B 7/11 |
| 1-274736 | 11/1989 | Japan | A61B 3/10 |
| 4-347131 | 12/1992 | Japan | A61B 3/113 |
| 5183798 | 7/1993 | Japan | H04N 5/232 |

*Primary Examiner*—Wendy Garber
*Attorney, Agent, or Firm*—Fitzpatrick, Cella, Harper & Scinto

[57] ABSTRACT

An image taking apparatus changing a size of the image receiving area based on a detected visual axis includes structure for detecting that a visual axis of an operator of the apparatus is directed to a mark lying in a viewfield. Image pickup structure is provided for receiving an image of an object in the viewfield, and for outputting electrical signals corresponding to the received image, the image pickup structure having an image receiving area from which the electrical signals are generated. Structure is provided for changing the size of the image receiving area of the image pickup structure when the visual axis is directed to the mark.

51 Claims, 22 Drawing Sheets

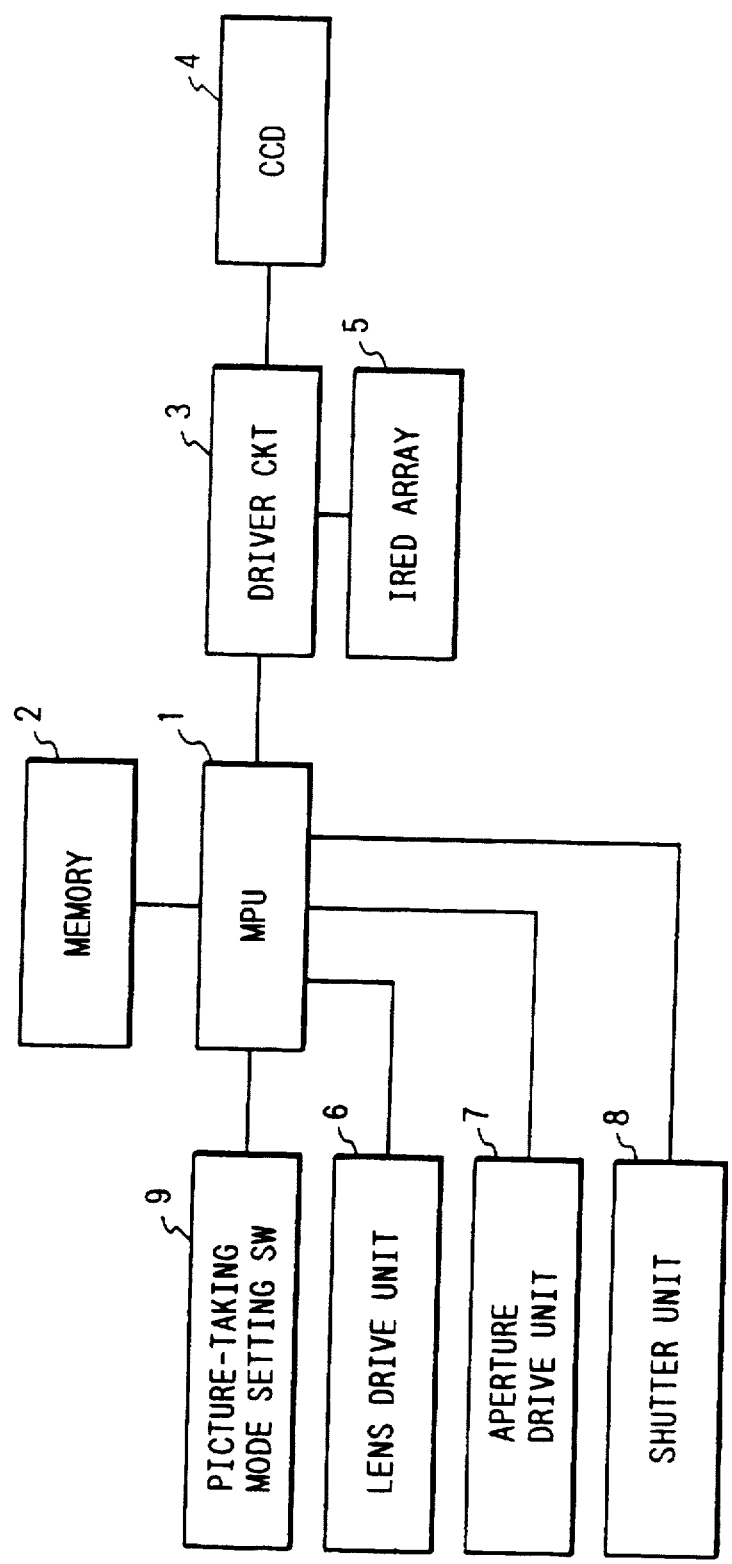

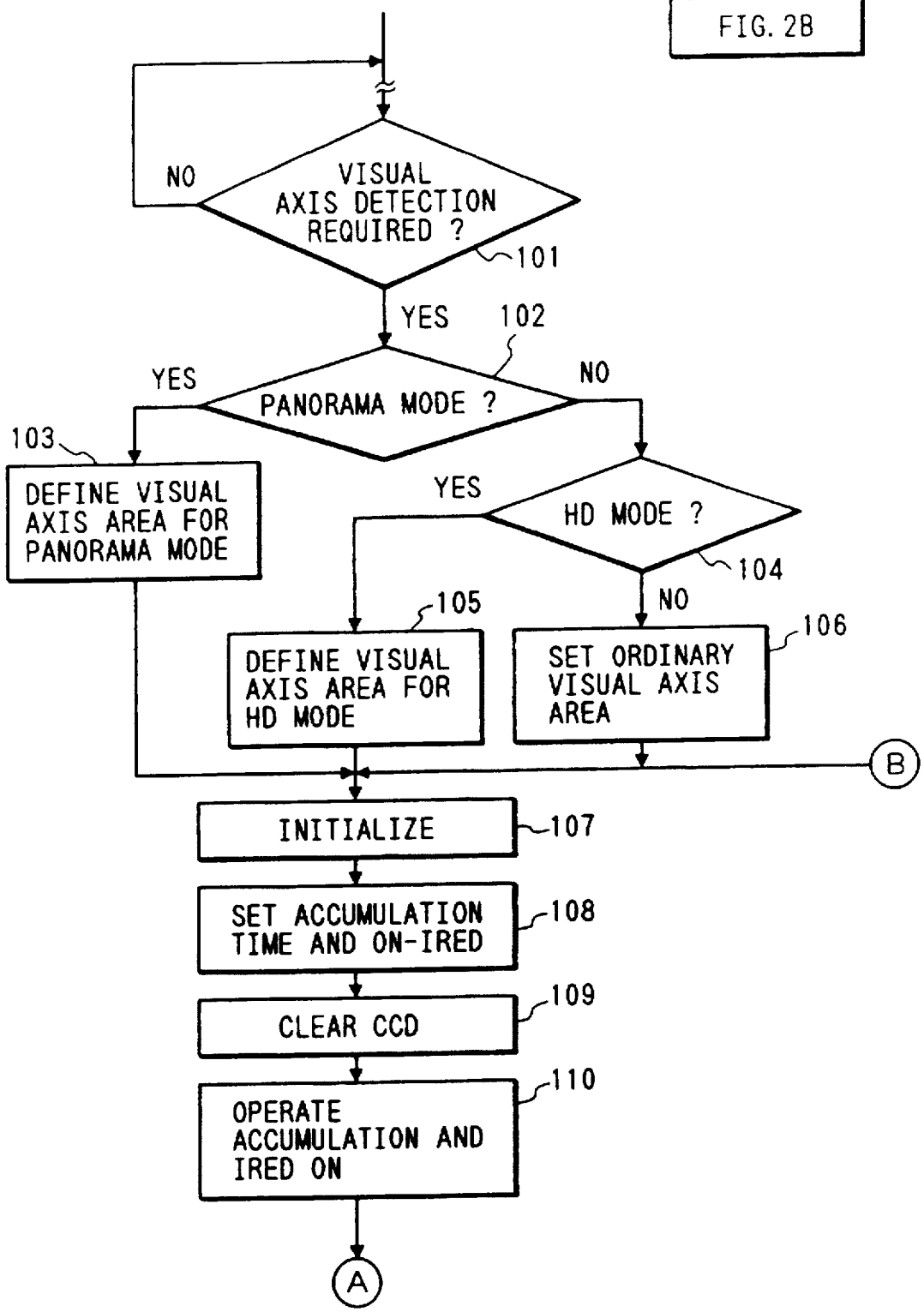

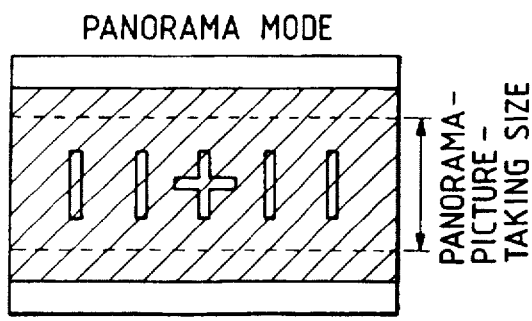
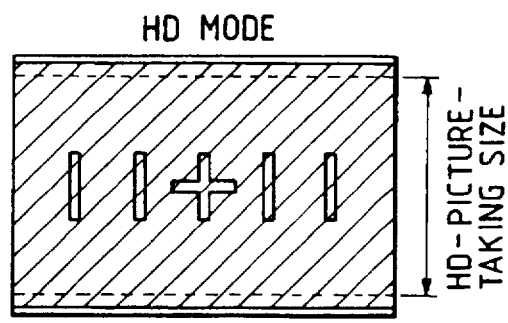
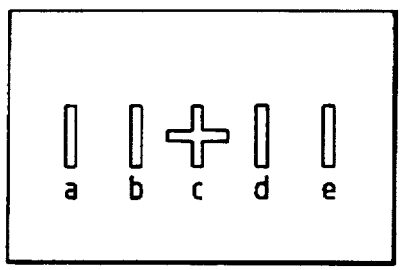
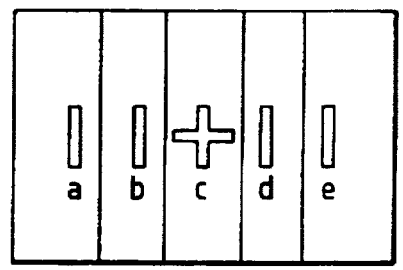
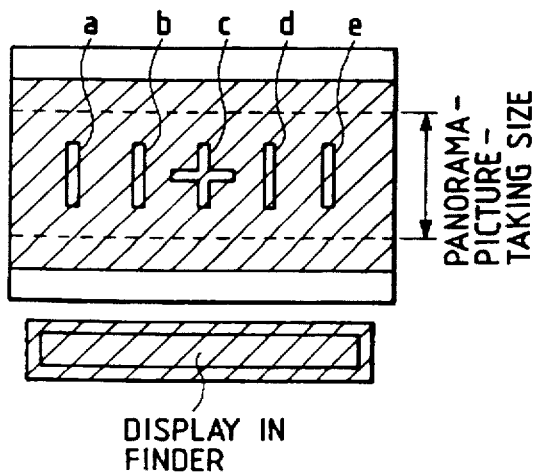
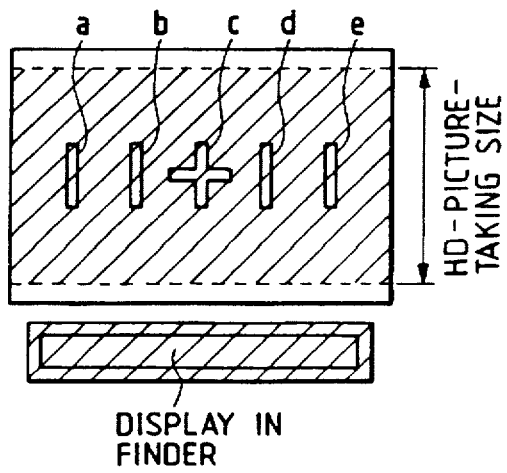

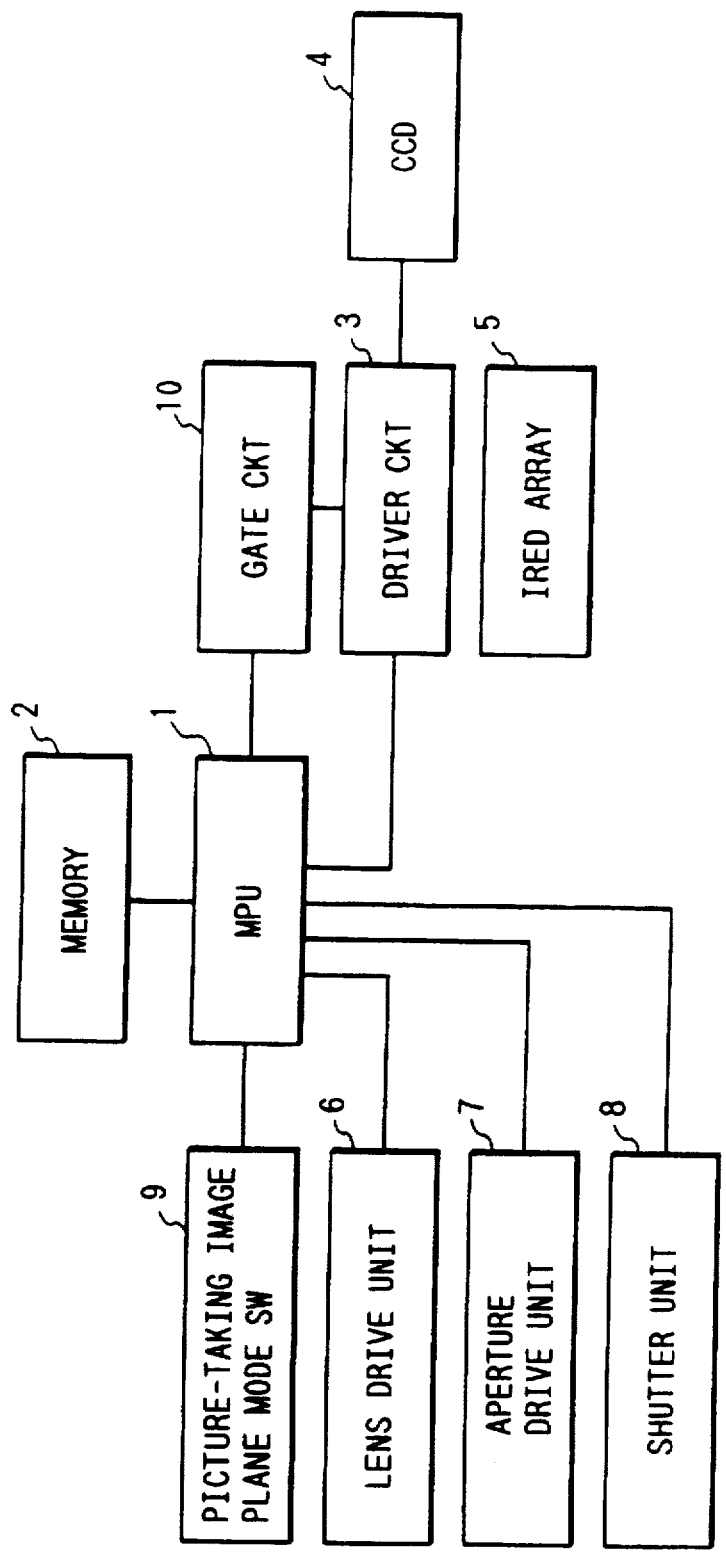

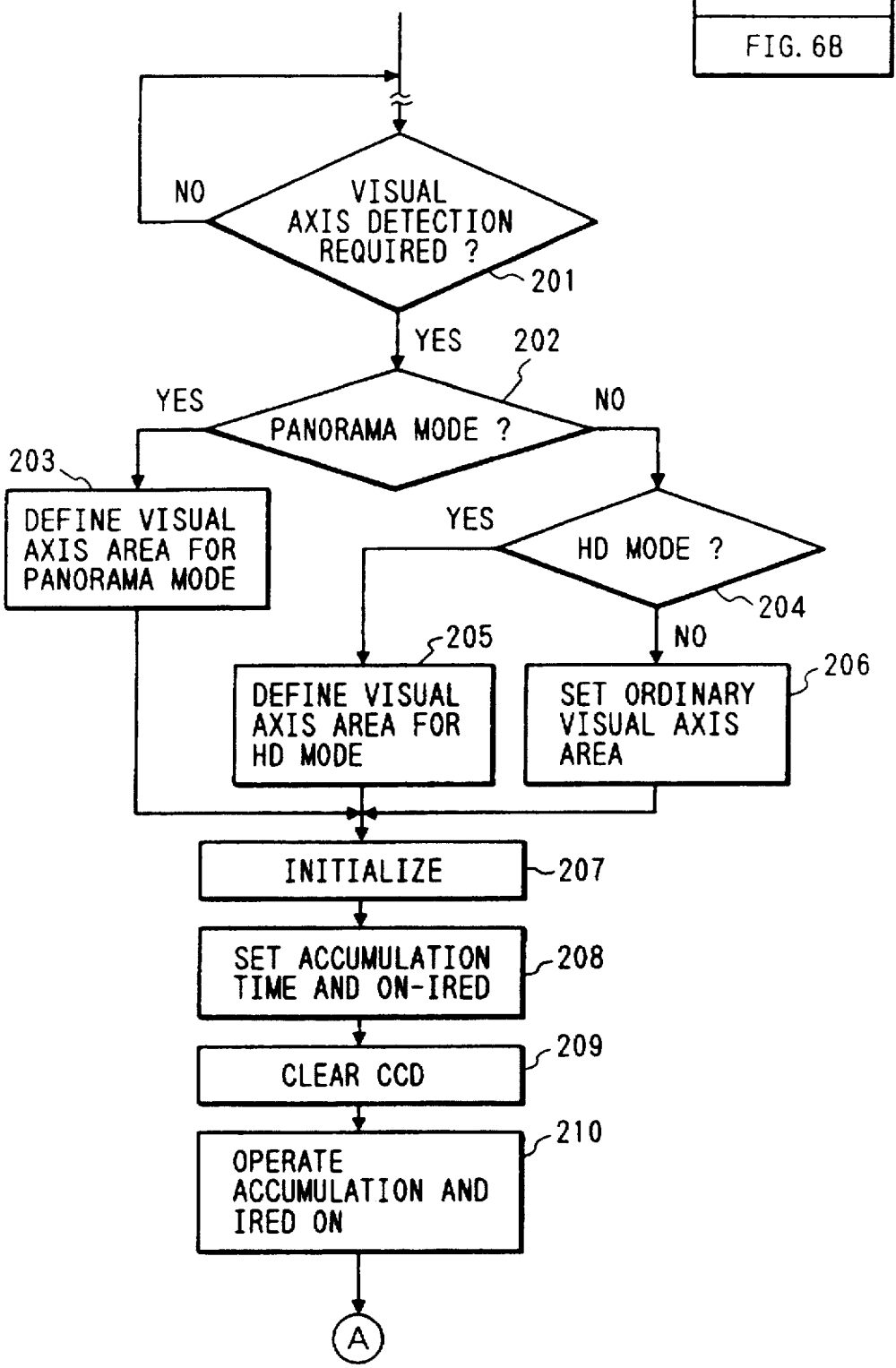

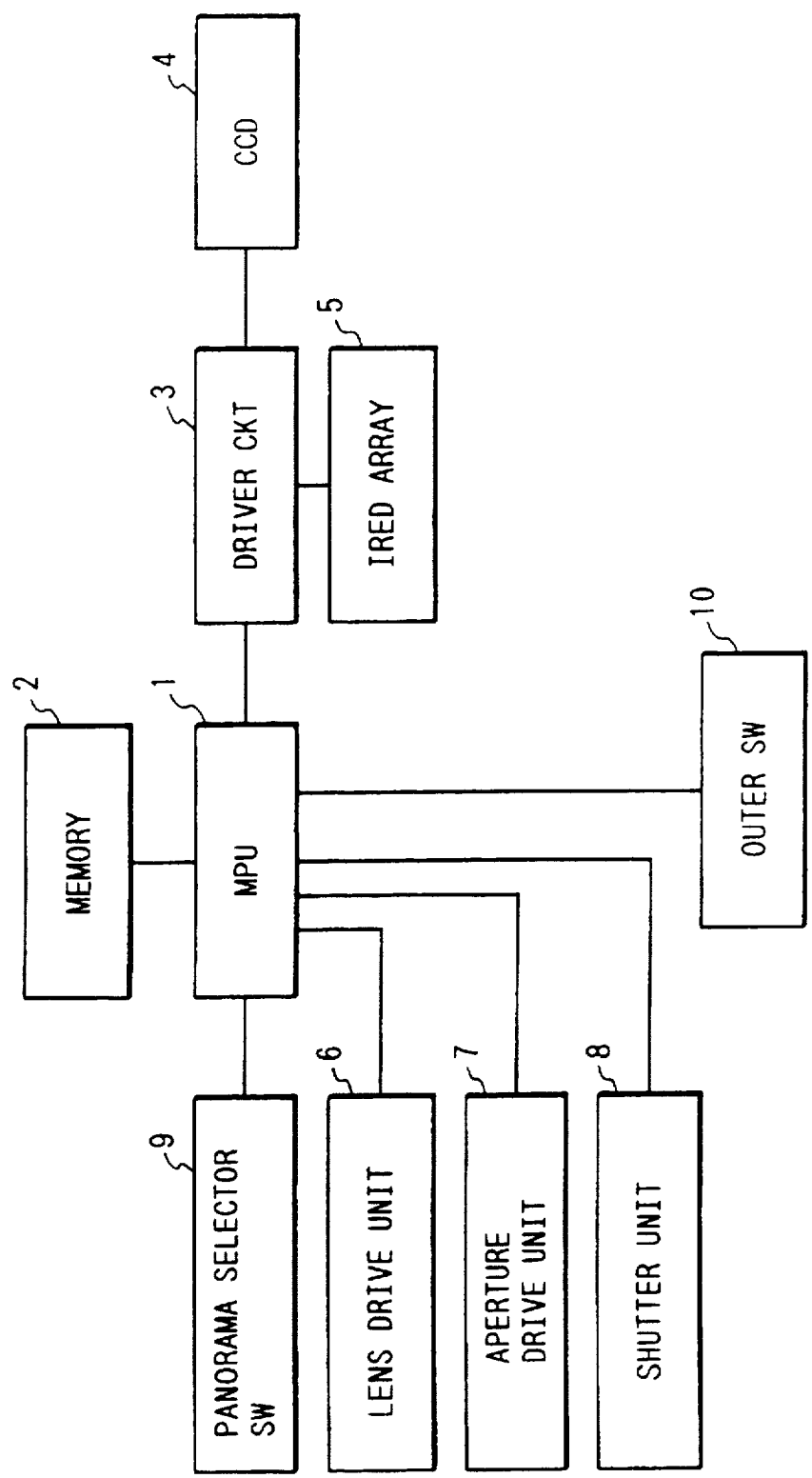

1

IMAGE-TAKING APPARATUS CHANGING THE SIZE OF AN IMAGE RECEIVING AREA BASED ON A DETECTED VISUAL AXIS

This application is a continuation of application Ser. No. 08/229,626, filed Apr. 19, 1994 now abandoned.

BACKGROUND OF THE INVENTION

1. Field of the Invention

The present invention relates to an image-taking (image pick-up) apparatus, more particularly, to an improved camera with a visual axis detection function and a picture field size changing function.

2. Related Background Art

In a camera having visual axis detection function, when the visual axis detection function is activated by turning on a switch (which turns on by the first stroke of a release button), and when the camera has an image-taking picture field mode partially utilizing an ordinary image-taking picture field (such as a panorama mode, an HD (High Definition; picture field size having a ratio vertical to horizontal 16:9) mode), the camera initiates the visual axis detection procedure and an MPU extracts a Purkinje image and a pupil's edge from an image signal read out from an image sensor, calculates a center of the Purkinje image and a center of the pupil, and further calculates the position of the view point of a user on a focusing screen.

Then, an automatic focusing operation is carried out by utilizing the distance measuring point most closely located to the calculated view point, and photometry corresponding to the distance measuring point is performed.

However, if the distance measuring point and the photometry point are determined by the same viewpoint to be in an ordinary picture field, and if the camera set to fake a panorama mode, an HD mode or the like field, the visual axis will be detected even though it exists outside of the panorama or HD picture field. This will result in an erroneous focus or photometry detection (including the case that an image-taking user erroneously watches any point except the intentioned view point).

SUMMARY OF THE INVENTION

The primary object of the present invention is to provide an improved image-taking apparatus such as single lens reflex camera, a video camera or the like to overcome the above-mentioned conventional shortcomings.

According to the first mode of the present invention, an image-taking apparatus permitting a change in a picture field size comprises detection means for detecting a visual axis and discrimination means for discriminating whether the visual axis is directed to a region corresponding to the picture field size or not.

According to the second mode of the present invention, an image-taking apparatus permitting a change in picture field size comprises detection means for detecting a visual axis and means for discriminating whether the visual axis is directed to a region corresponding to the picture field size or not, and for redetecting the visual axis by utilizing the detection means if the visual axis is not directed to the region.

According to the third mode of the present invention, an image-taking apparatus permitting a change in picture field size comprises a detection means for detecting a visual axis, and means for discriminating whether the visual axis is directed to a region corresponding to the picture field size or not, and for invalidating information with respect to the visual axis if the visual axis is not directed to the region.

According to the fourth mode of the present invention, an image-taking apparatus permitting a change in picture field size comprises detection means for detecting a visual axis, which has an image sensor for converting an intensity distribution of a light from an eye into an electric signal, and selection means for selecting a region from which the electric signal is read out in accordance with the picture field size.

According to the fifth mode of the present invention, an image-taking apparatus permitting a change in picture field size comprises detection means for a visual axis, which has an image sensor for converting an intensity distribution of a light from an eye into an electric signal, and selection means for selecting the electric signal which is read out from the image sensor in accordance with the picture field size.

According to the sixth mode of the present invention, an image-taking apparatus permitting a change in picture field size comprises detection means for a visual axis, which has an image sensor for converting an intensity distribution of a light from an eye into an electric signal, and control means for selecting a region from which the electric signal is read out in accordance with the picture field size, and for discriminating whether the visual axis is directed to the region corresponding to the picture field size or not.

According to the seventh mode of the present invention, an image-taking apparatus permitting a change in picture field size comprises detection means for detecting a visual axis, which has an image sensor for converting an intensity distribution of a light from an eye into an electric signal, and control means for selecting the electric signal from the image sensor in accordance with the picture field size, and for discriminating whether the visual axis is directed to a region corresponding to the picture field size or not.

According to the eighth mode of the present invention, an image-taking apparatus permitting a change in picture field size comprises detection means for detecting a visual axis, and changing means for changing the picture field size in accordance with the visual axis.

According to the ninth mode of the present invention, an image-taking apparatus permitting a change in picture field size comprises detection means for detecting a visual axis, and forbidding means for forbidding the taking of an image in accordance with the detected visual axis.

According to the tenth mode of the present invention, an image-taking apparatus permitting a change in picture field size comprises detection means for detecting a visual axis, and forbidding means for forbidding the taking of an image when the picture field size is set to be a first size and the visual axis is directed to a picture field other than the picture field with the first size.

BRIEF DESCRIPTION OF THE DRAWINGS

FIG. 1 is a block diagram illustrating a structure of a camera with visual axis detection function according to the first embodiment of the present invention;

FIG. 3A is a view illustrating an area where a visual axis exists in a panorama mode according to the first embodiment of the present invention;

FIG. 3B is a view illustrating an area where a visual axis exists in a HD mode according to the first embodiment of the present invention;

FIG. 4A is a view illustrating an AF area according to the first embodiment of the present invention;

FIG. 4B is a view illustrating an AE area according to the first embodiment of the present invention;

FIG. 5 is a block diagram illustrating a structure of a camera with visual axis detection function according to the second embodiment of the present invention;

FIG. 7A is a view illustrating an area where a visual axis exists in a panorama mode according to the second embodiment of the present invention;

FIG. 7B is a view illustrating an area where a visual axis exists in an HD mode according to the second embodiment of the present invention;

FIG. 20 is a block diagram illustrating a structure according to the tenth embodiment of the present invention;

DETAILED DESCRIPTION OF THE PREFERRED EMBODIMENTS

Figure 2B:
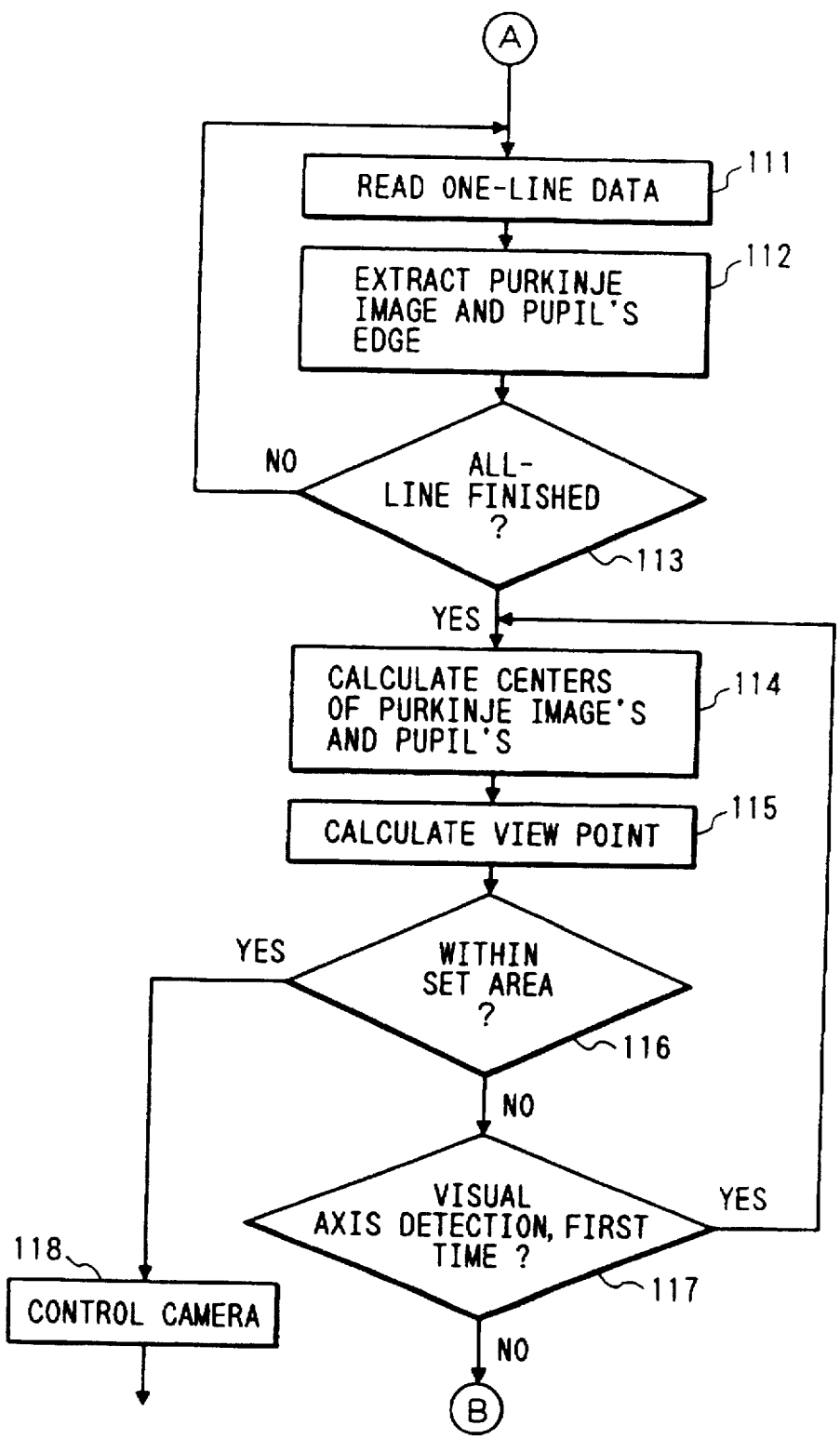
FIG. 2 is comprised of FIGS. 2A and 2B showing flow charts illustrating an operation of the MPU shown in FIG. 1.

FIG. 1 is a block diagram illustrating a structure of a camera with visual axis detection function, in which the MPU (micro processing unit) is represented by numeral 1; a memory 2; a driver circuit for CCD and IRED (described later) 3; CCD 4, as an image sensor, which responds to an image of a user's eye to detect visual axis; an IRED array 5 constituted of a plurality of infra-red light emitting diodes; a lens drive unit 6 for automatically moving an objective lens so as to focus the objective lens onto a film surface; an aperture drive unit for changing an aperture diameter of the objective lens 7; a shutter unit for opening or closing a shutter in front of the film 8; and a setting switch 9 equipped in a camera for setting an image-taking mode (size).

The lens drive unit 6 is controlled in response to the detection result of the focusing state (defocus) of a photographic object detected by a well known focus point detection apparatus (not shown). In the present embodiment, as the focus point detection apparatus, an apparatus is used which can detect the focusing image state on multiple different points of the photographic object.

The concrete structures of the camera, the visual axis detection apparatus and the focus point detection apparatus are disclosed in Japanese Patent Laid-Open Application Nos. 1-241511 and 1-274736.

In the present embodiment, a visual axis of the image-taking user is obtained by processing image signals from the CCD 4. The principle is stated as follows:

When the eyeball of an image-taking user (photographer) is illuminated by parallel light (or divergent light) from a light emitting diode, the light is reflected by the front end of the cornea to produce an imaginary image of the light emitting diode. This imaginary image is called a Purkinje image, the production position of which coincides with the center of the pupil in a case that a rotation angle of the eyeball is zero.

With the rotation of the eyeball, a distance between the Purkinje image and the center of the pupil is expanded in approximate proportion to the sine of the rotation angle. Accordingly, the rotation angle of the eye and further also the view point of the user's eye can be known by detecting the position of the Purkinje image and the center of the pupil based on the video image signals on the CCD 4 and thereafter calculating the distance therebetween. Even though the head moves relative to the camera, the view point stays at the same location on a focusing screen due to the optical characteristics of the finder of the camera if the rotation angle of the eyeball is the same.

Further explanation will be made referring to flow charts shown in FIGS. 2A and 2B as to an operation of the camera employing the visual axis detection function described above. When visual axis detection is required of the camera at step 101 by pushing a release button, the MPU 1 enters into a visual axis detection routine.

First, the MPU 1 reads a setting of the image-taking picture field size from the image-taking picture field mode setting switch 9 at the step 102 for defining an area where the visual axis should exist in a field on the focusing screen of the finder of the camera (an effective area).

When a panorama mode has been set, an area, as shown with oblique lines in FIG. 3A, where the visual axis for the panorama mode should exist is defined at the step 103. This is done to include taking into consideration the image-taking picture field size of the panorama mode and each of the measuring points of the focus detection apparatus.

When an HD mode is set, an area, as shown with oblique lines in FIG. 3B, where the visual axis for the HD mode should exist, is defined at the steps 102, 104 and 105. This is also done in the same manner as the panorama mode for the area where the visual axis should exist so as to include taking into consideration the image-taking picture field size of the HD mode and each of the measuring points of the focus detection apparatus.

When an ordinary image-taking picture field size is set, the definition of the area where the visual axis should exist is released and the area where the visual axis should exist in the ordinary image-taking picture field size is defined at the steps 102, 104 and 106.

A read-out area of the image signal from the CCD 4 is concurrently defined. When the ordinary image-taking picture field size is set, the image signal of the whole field is read-out. When the panorama mode or the HD mode is set, since the visual axis scarcely moves in a vertical direction of the finder as compared with the case in which the ordinary image-taking picture field size is set, the area where the eye of the image-taking user exists can be restricted to some extent. Accordingly, when the panorama mode or the HD mode is set, the read-out area of the image from the CCD 4 is defined in manner so as to cut top and a bottom portions. This can be realized in a software form by the MPU 1 to process the read-out signal from the CCD 4.

When the read-out area in the panorama mode or the HD mode is defined from lines $Lv_1$ to $Lv_2$ in the CCD 4, for the lines from the first to ($Lv_1-1$), a signal for driving the CCD 4 is transferred to the driver circuit 3, but the MDU does not perform an A/D conversion for the output of the CCD 4, an optical image block (a Purkinje image candidate), or an extraction processing of pupil edge candidates or the like.

When the read-out area reaches the line $Lv_1$, the CCD 4 is driven in the same manner as the previous steps to perform the A/D conversion of its output so as to extract the optical image block (the Purkinje image candidate or the pupil edge candidate). This procedure is executed up to the line $Lv_2$. The procedure from the line ($Lv_2+1$) to the last line continues to merely drive the CCD 4 in the same manner as performed from the first line to the line ($Lv_1-1$). Then, after initializing variables utilized in calculation at the step 107, the MPU 1 sets accumulation time of the CCD 4 taking into account the existence of glasses and the intensity of outer light.

At the same time, in response to the position (vertical position or horizontal position) of the camera indicated by a position sensor (not shown), a light emitting diode (which should be turned on by judging whether a user wears glasses or not) can be selected at the step 108, followed by the accumulation control step of the CCD 4.

First, the MPU 1 instructs the driver circuit 3 to execute a clear mode operation at the step 109. The driver circuit 3 which receives the instruction performs the clear operation to erase remaining electric charges in a memory zone of the CCD 4, a charge transfer line or the like. Subsequently, the MPU 1 sends an IRED selective signal to the driver circuit 3 in order to turn on the selected light emitting diode and simultaneously sets the accumulation signal high at the step 110. This starts the accumulation synchronized with turning on the light emitting diode. Then, with the lapse of the predetermined accumulation time, the accumulation signal turns into a low level so that the accumulation terminates. Next, the MPU 1 executes an extraction procedure of the optical image block (Purkinje image candidate) or the pupil's edge candidate.

When the MPU 1 catches the designated read-out line, it reads the image signal one line by one line successively by way of a driver circuit 3, performs an A/D conversion, and stores the converted value of the image signal into the memory 2 at the step 111.

The extraction procedure of the optical image block (Purkinje image candidate) and the pupil's edge candidate will be done by utilizing the above data at the step 112.

The MPU 1 performs the above procedure with a prescribed number of lines designated in the read-out area of the CCD 4 which has been set to be read out at the steps 111, 112, 113 and 111 ... in order.

Namely, only the transfer operation is performed and the A/D conversion and the extraction operations are not performed as to the discarded top and bottom lines. After completion of the above procedure as to all the read-out lines, the Purkinje image and the pupil's edge are detected at the step 114. Then, the center and the radius of the pupil are calculated by utilizing the detected pupil's edge.

A method of least squares can be utilized, as disclosed, for example, in Japanese Patent Laid-Open Application No. 4-347131, to calculate the center and the radius of the pupil. After that, the MPU 1 calculates a rotation angle of the eyeball and performs its correction due to individual difference, by utilizing positions of the Purkinje image and the center of the pupil, and finally calculates the position of the view point on a focusing screen of the camera at the step 115.

Then, the MPU 1 compares the detected result of the position of the view point with the area where the visual axis exists which has been defined in accordance with the image-taking picture field size. In the result, when the detected view point exists in the area, the MPU 1 progresses to a routine to control an operation of the camera by utilizing the view point at the steps 116 and 118 in order.

On the other hand, when the view point is detected outside of the existing area, the currently detected result of the visual axis is regarded as erroneous detection (failure) and the detection of the visual axis will be tried again. Namely, if the first detection of the visual axis by reading out the image from the CCD 4 fails, selection of the Purkinje image and the center of the pupil is retried.

The rotation angle of the eyeball and its correction due to individual difference are calculated in accordance with the above result and further calculated is the position of the view point on the focusing screen of the camera at the steps 116, 117, 114 and 115 in order. Then, the MPU 1 compares the detected result of the position of the view point with the area where the visual axis exists which has been defined in accordance with the image-taking picture field size. In the result, when the detected view point exists in the area, the MPU 1 progresses to a routine to control an operation of the camera by utilizing the view point at the steps 116 and 118 in order.

Further, when the view point is again detected outside of the existing area, the currently detected result of the visual axis is regarded as erroneous detection (failure) and the detection of the visual axis will be tried again. This redetection is done by starting the operation of the visual axis from the beginning at the steps 116, 117, 107, 108, and 116 in order. Namely, after initializing variables which are used in calculation, the accumulation time is set and the designated light emitting diode is selected. It follows in the successive accumulation control step that the driver circuit 3 performs a clear operation, transmits the IRED selected signal to the CCD driver in order to turn on the light emitting diode, accumulates electric charges into the CCD 4 and turns on the light emitting diode in synchronization with the accumulated electric charges in the CCD 4. Then, the CPU1 performs (by a number of lines of the CCD 4) procedures of the optical image block (Purkinje image candidate) and the pupil's edge candidate extraction.

When all the lines are completed with these procedures, detection procedure for the Purkinje image and the pupil's edge is performed so that the center and the radius of the pupil are calculated by utilizing the detected pupil's edge. After that, the rotation angle of the eyeball and its correction due to individual differences and the like are calculated by utilizing the positions of the Purkinje image and the center of the pupil to determine the position of the view point on the focusing screen of the camera. The detection result of the view point is compared with the area where the visual axis should exist defined in accordance with the image-taking picture field size. The above-mentioned procedures will be done until the detection of the visual axis results in success.

The above detected view point determines, so called, a distance measuring point and a photometry point with which a focusing point is detected when an autofocus operation is instructed by the camera. By the way, a camera using a silver salt film generally requires the same numbers of distance measuring units when the distance measuring points increase, accordingly the number of the distance measuring points must be restricted due to demerits of cost and space. This may cause the possibility that there exist no distance measuring points at the position of the view point on the focusing screen.

Accordingly, the following interpolation procedure will be performed.

The first method determines a distance measuring point most closely located to the view point on the focusing screen as the distance measuring point of the view point if there exist no distance measuring points corresponding to the position of the view point on the focusing screen. In case, for example, that distance measuring points a, b, c, d and e are set as illustrated in FIG. 4A, the distance length L between a coordinate (X, Y) and each of coordinates (Xa, Ya), (Xb, Yb), (Xc, Yc), (Xd, Yd) and (Xe, Ye) is calculated in accordance with the following equation in a case that the distance measuring point is defined as "a":

$$L^2 = (X-X_A)^2 + (Y-Y_A)^2$$

wherein (X, Y) are a coordinate of the position of the view point; and (Xa, Ya), (Xb, Yb), (Xc, Yc), (Xd, Yd) and (Xe, Ye) are coordinates of the central position of the five distance measuring points a, b, c, d, and e. Then, the length L having minimum value is determined as the distance measuring point at the position of the visual axis.

The second method employs setting of a predetermined area from which the distance measuring points are selected. For example, as illustrated in FIG. 4B, the distance measuring points a, b, c, d and e and their selection areas are also defined.

Although similar methods can be employed as to determination of the photometry point, the above mentioned second method may be mainly applied because area divisional type photometry sensors are often used. By the way, the view point of an actual image-taking user is not always directed to a photographic object but fluctuates in some degrees and is often directed to display outside of the picture field. Accordingly, when the view point is out of the picture field, it is necessary to employ procedures to invalidate the area successive operation or to extract the view point with which an image-taking user pays attention by applying the well known technique.

Then, when an automatic focussing operation and an automatic exposure operation are required, the auto-focus operation and the photometry operation will be performed.

Namely, the auto-focus operation will be performed in a following manner described below. The MPU 1 reads the signal corresponding to the distance measuring point determined by the sensor of the focus detection apparatus and calculates the driving amount of the objective lens by processing the above-obtained signal.

Subsequently, the lens drive unit 6 is so controlled to move the objective lens to accomplish focus adjustment. Further, the MPU 1 calculates exposure constants such as a shutter speed, an aperture value and the like based on the signal from the photometry sensor in accordance with the designated image-taking mode.

After that, when release request is issued, the aperture is driven to realize the aperture value calculated by the aperture drive unit 7 and the shutter is opened or closed by the shutter unit 8. Then, a series of operations with respect to release such as winding up of a film will be performed by a film supplying circuit (not shown).

Figure 6B:
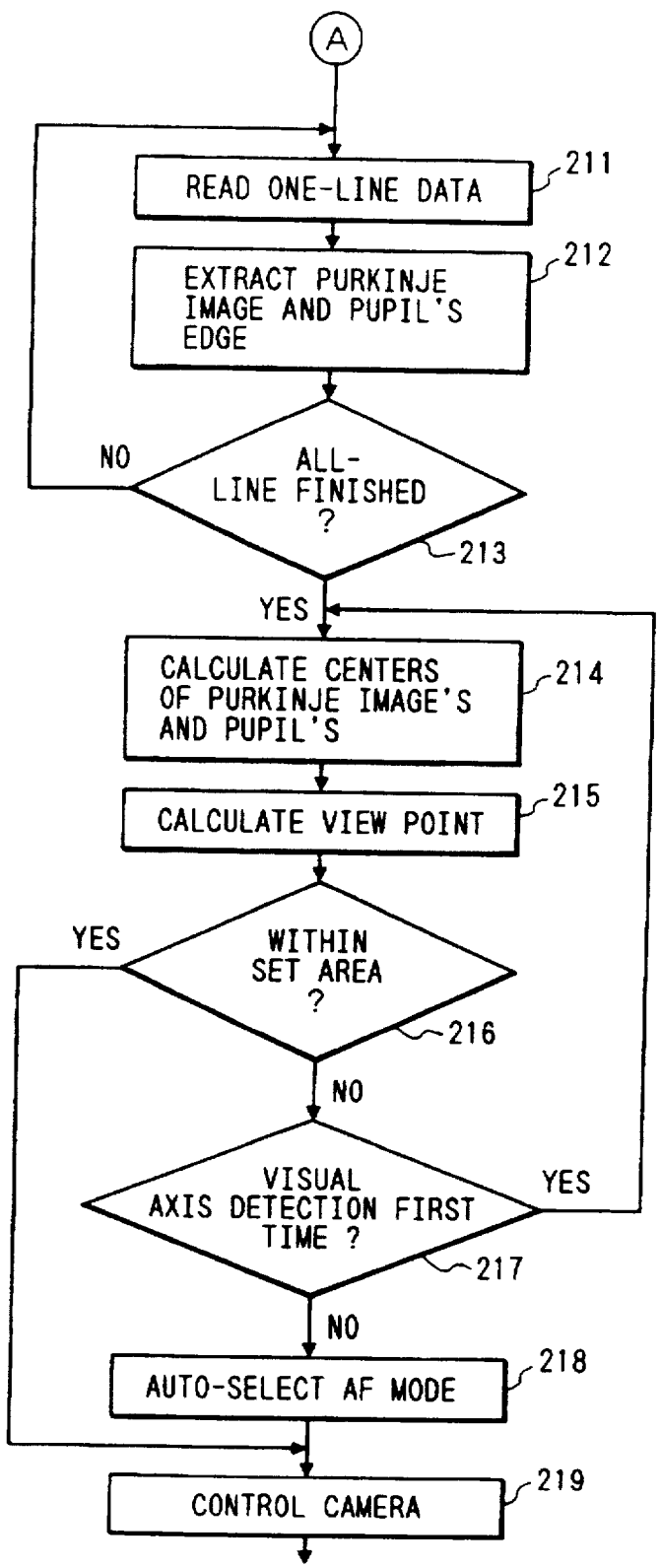
FIG. 6 is comprised of FIGS. 6A and 6B showing flow charts illustrating an operation of the MPU shown in FIG. 5.

FIG. 5 is a block diagram illustrating a structure of a camera with visual axis detection function according to the second embodiment of the present invention, in which the identical members shown in FIG. 1 bear the same numerals. The only different point from the first embodiment is to employ a gate circuit which realizes that the area where the visual axis should exist includes a region in which displays within the finder are displayed in the panorama mode or the HD mode. Now, an operation of the camera according to the second embodiment will be explained in accordance with the flow charts illustrated in FIGS. 6A and 6B.

Similarly to the first embodiment described above, when visual axis detection is required of the camera by pressing the release button at the step 201, the MPU 1 enters a routine of the visual axis detection.

First, the MPU 1 reads the image-taking picture field size from the image-taking picture field size mode setting switch 9 at the step 202 and defines the area where the visual axis should exist on the focusing screen of the camera finder in accordance with the above result.

If the panorama mode has been set, a visual axis existing area for panorama mode as illustrated with oblique lines in FIG. 7A is set at the step 203. This is done in a manner to include the image-taking picture field size for panorama mode, the distance measuring points a, b, c, d and e of the camera and the region in which the displays within the finder are shown. If the HD mode has been set, a visual axis existing area for HD mode as illustrated with oblique lines in FIG. 7B is set at the steps 202, 204 and 205 in order.

This is done, similarly to the panorama mode, in a manner to include the image-taking picture field size for HD mode, the distance measuring points a, b, c, d and e of the camera and the region in which the displays within the finder are shown. If the ordinary image-taking picture field size has been set, the definitions of the visual axis existing area set respectively either in the panorama mode or the HD mode are released and the visual axis existing area for the ordinary picture field size is set at the steps 202, 204 and 205 in order, concurrently setting a read out region from which an image signal from the CCD 4 is read out.

If the ordinary image-taking picture field size is set, the image signal corresponding to all the picture field is read out.

If the panorama mode or the HD mode is set, since the visual axis scarcely moves in a vertical direction of the finder as compared with the case in which the ordinary image-taking picture field size is set, the visual axis existing area of the image-taking user can be restricted to some extent.

Accordingly, when the HD mode is set, the read-out area of the image from the CCD 4 is defined in a manner so as to discard top and bottom portions. This can be realized by providing an instruction signal, which defines the image signal delivered to the MPU 1 from the gate circuit 10 disposed between the MPU 1 and the driver circuit 3, to the gate circuit 10.

When the MPU 1 instructs the gate circuit 10 lines $Lv_1$ and $Lv_2$ as the read-out area, the gate circuit 10 outputs signals corresponding to the defined area from the line $Lv_1$ to the line $Lv_2$ to the MPU 1. Namely, signals corresponding from the first line to the line ($Lv_1-1$) and signals corresponding from the line ($Lv_1+1$) to the last line are not output to the MPU 1 and only signals corresponding from the line $Lv_1$ to the line $Lv_2$ are output.

Accordingly, the visual axis detection with utilizing image signals corresponding to the defined area can be realized by the similar control or the processing with which all the picture field of the CCD 4 are read out by software.

After initialization of variables utilized in calculation at the step 207, the MPU 1 sets the accumulation time of the CCD 4 taking into consideration whether glasses exist or not and the intensity of the ambient light.

At the same time, in response to the position (vertical position or horizontal position) of the camera indicated by a position sensor (not shown), an IRED to be turned on is selected at the step 208, taking into consideration whether glasses exist or not, followed by the accumulation control step.

First, the MPU 1 instructs the driver circuit 3 to execute a clear mode operation at the step 209. The driver circuit 3 which receives the instruction performs the clear operation to erase remaining electric charges within a memory zone or the CCD 4, a charge transfer line or the like. Subsequently, the MPU 1 sends an IRED selective signal to the driver circuit 3 in order to turn on the selected light emitting diode and sets the accumulation signal so as to be high level at the step 210. This starts the accumulation of electric charges to the CCD 4 synchronized with turning on the light emitting diode.

Then, after the lapse of the predetermined accumulation time, the accumulation signal turns into a low level so that the accumulation terminates. Next, the MPU 1 executes the extraction procedure of the optical image block (Purkinje image candidate) and the pupil's edge candidate.

The MPU 1 reads the image signal one line by one line successively through the gate circuit 10, performs an A/D conversion and stores its value into the memory 2 at the step 211. The extraction procedure of the optical image block (Purkinje image candidate) and the pupil's edge candidate will be done by utilizing the above data at the step 212.

The MPU 1 performs the above procedure with a prescribed number of lines designated in the read-out area of the CCD 4 which has been set to be read out at the steps 211, 212, 213 and 211 ... in order. After completion of the above procedure as to all the readout lines, the Purkinje image and the pupil's edge are detected at the step 214. Then, the center and the radius of the pupil are calculated by utilizing the detected pupil's edge.

A method of least squares can be applied for the above calculation. After that, the MPU 1 calculates a rotation angle of the eyeball and performs its correction due to individual differences, by utilizing positions of the Purkinje image and the center of the pupil, and finally calculates the position of the view point on a focusing screen of the camera at the step 215. Then, the MPU 1 compares the detected result of the visual axis with the visual axis existing area which has been defined in accordance with the image-taking picture field size. In the result, when the detected visual axis exists in the area, the MPU 1 progresses to a routine to control an operation of the camera by utilizing the view point at the steps 216 and 219 in order.

On the other hand, when the view point is detected outside of the existing area, the currently detected result of the visual axis is regarded as erroneous detection (failure) and the detection of the visual axis will be tried again. Namely, if the first detection of the visual axis by reading out the image from the CCD 4 results in erroneous detection, selection of the Purkinje image and the center of the pupil is retried. The rotation angle of the eyeball and its correction due to individual differences are calculated in accordance with the above result and further calculated is the position of the view point on the focusing screen of the camera at the steps 216, 217, 214 and 215 in order.

Then, the MPU 1 compares the detected result of the view point with the visual axis existing area defined in accordance with the image-taking picture field size. In the result, when the detected view point exists within the area, the MPU 1 progresses to a routine to control an operation of the camera by utilizing the view point in the same manner described above at the steps 216 and 219 in order. Further, when the view point is again detected outside of the existing area, the currently detected result of the view point is regarded as failure and no further detection of the view point will be performed. A main photographic object is presumed to exist at the closest position (position with minimum distance) in the image-taking picture field in accordance with a plurality of distance informations obtained from the distance measuring result for a plurality of the distance measuring points.

Under the above method, an automatic focussing operation will be made at the closest point in distance among a plurality of the distance measuring points in almost all cases even though consideration is given as to the minimum image-taking distance of the image-taking lens utilized for excluding obstacles and the position of the distance measuring point in the image-taking picture field. Then, the light measuring point in connection with the distance measuring point is calculated. When an automatic focussing operation and photometry operation are required, the auto-focus operation and the light measuring operation will be performed.

Namely, the auto-focus operation will be performed in a following manner described below. The MPU 1 reads the signal corresponding to the distance measuring point determined by the sensor of the focus detection apparatus and calculates the driving amount of the objective lens by processing the above obtained signal.

Subsequently, the lens drive unit 6 is controlled so as to move the objective lens to accomplish focus adjustment. Further, the MPU 1 calculates exposure constants such as a shutter speed, an aperture value and the like based on the signal from the photometry sensor in accordance with the designated image-taking mode.

After that, when release request is issued, the aperture is driven to realize the aperture value calculated by the aperture drive unit 7 and the shutter is opened or closed by way of the shutter unit 8. Then, a series of operations with respect to a release such as winding up of a film will be performed by way of a film feeding circuit (not shown). Since each of the embodiments employs a visual axis detection circuit for detecting a visual axis of an image-taking user and a circuit for knowing an image-taking picture field size and defines a visual axis existing area detected by the visual axis detection circuit in accordance with the setting condition of the picture field size, clear misdetection can be avoided beforehand. When the image is taken by partially utilizing the ordinary image-taking picture fields in the panorama mode or the HD mode or the like, it is expected to watch the area within the ordinary picture field and outside of the image-taking area of the panorama mode (HD mode) to confirm the setting under the above circumstance. If the visual axis detection is executed, the conventional method causes misdetection but the present embodiment can avoid the misdetection beforehand. Since the photometry is connected with the distance measuring point, the optimum photometry point can be selected under whatever circumstances might be. Further, if the Purkinje image or the pupil's edge is misdetected due to noises superimposed on an image signal of the image sensor, that is a CCD, they can be easily corrected.

If the read-out area from the image sensor for visual axis detection is defined when the image-taking picture field size is set to either a panorama mode or an HD mode, high speed operation can be achieved.

Figure 8:
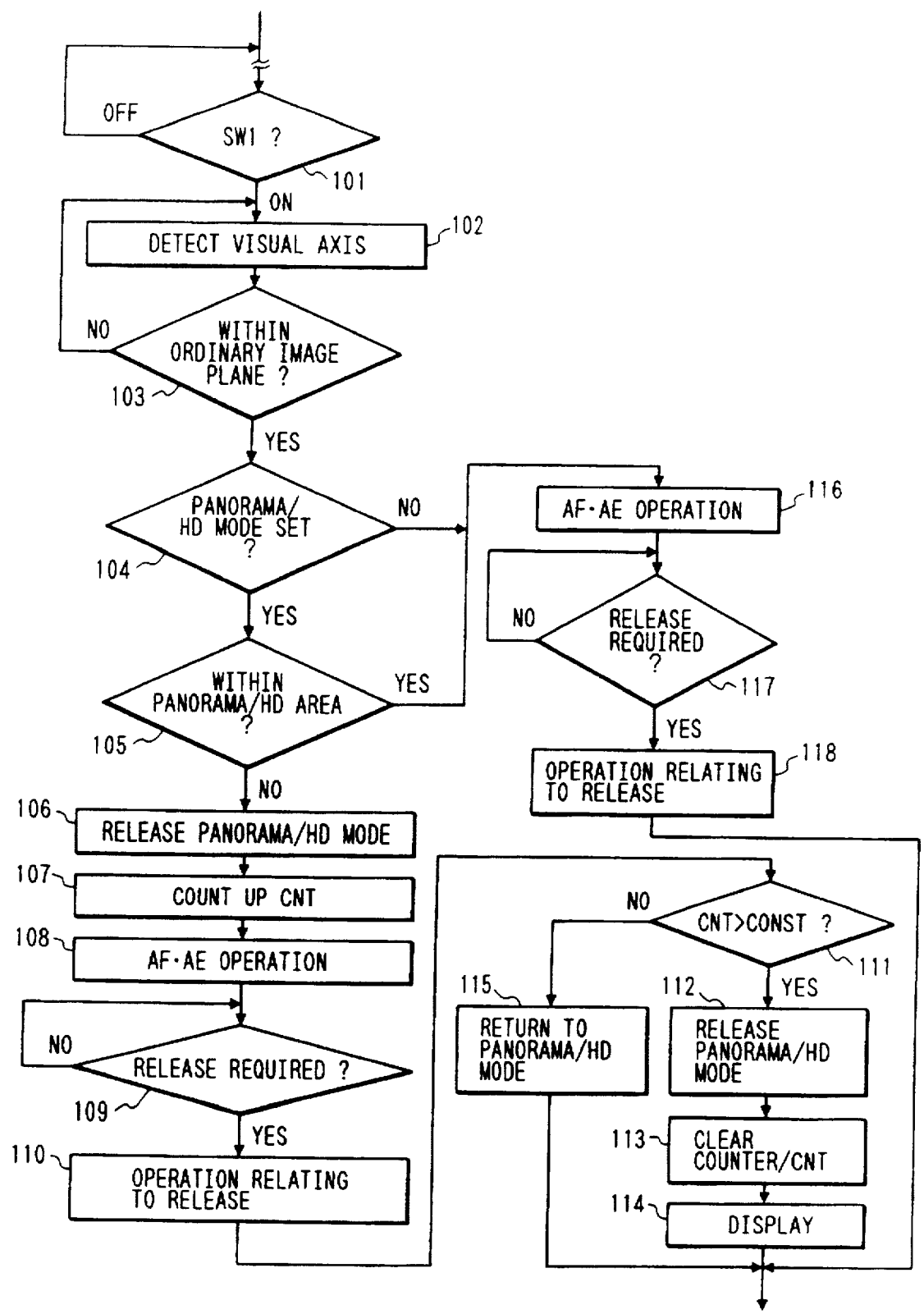
FIG. 8 is a flow chart illustrating an operation of a camera according to the second embodiment of the present invention.

Further explanation will be made referring to a flow chart shown in FIG. 8 as to an operation of the camera employing the visual axis detection function according to the third embodiment. The main structure of the camera according to the present embodiment is the same as that shown in FIG. 1.

When the switch SW1 which is turned on with the first stroke of a release button turns on at the step 101, the MPU 1 progresses to a routine having a series of operations such as automatic focussing, automatic exposure and the like for image-taking. At the beginning of the series of operations, the MPU 1 detects the visual axis of a user at the step 102. This is done in a following manner by utilizing a well-known visual axis detection circuit. First, an initialization procedure is performed to initialize variables utilized in calculation and thereafter the MPU 1 sets the accumulation time of the CCD 4 taking into account whether glasses are worn or not and the intensity of outer light.

At the same time, in response to the position (vertical position or horizontal position) of the camera indicated by a position sensor (not shown), a light emitting diode (which should be turned on by taking into account whether glasses are worn or not) can be selected, followed by the accumulation control step of the CCD 4. First, the MPU 1 instructs the driver circuit 3 to execute a clear mode operation. The driver circuit 3 which receives the instruction performs the clear operation to erase remaining electric charges in a memory zone of the CCD 4, a charge transfer line or the like. Subsequently, the MPU 1 sends an IRED selective signal to the driver circuit 3 in order to turn on the selected light emitting diode and sets the accumulation signal so as to be high level. This starts the accumulation synchronized with turning on the light emitting diode. Then, with the lapse of the predetermined accumulation time, the accumulation signal turns into a low level so that the accumulation terminates.

Next, the MPU 1 executes the extraction procedure of the optical image block (Purkinje image candidate) and the pupil's edge candidate.

First, the MPU 1 reads the image signal one line by one line successively, performs an A/D conversion and stores its value into the memory 2.

The extraction procedure of the optical image block (Purkinje image candidate) and the pupil's edge candidate will be done by utilizing the above data. The MPU 1 performs the above procedure with a prescribed number of lines designated in the read-out area of the CCD 4.

After completion of the above procedure as to all the read-out lines, the Purkinje image and the pupil's edge are detected. Then, the center and the radius of the pupil are calculated by utilizing the detected pupil's edge.

A method of least squares can be utilized, as disclosed, for example, in Japanese Patent Laid-Open Application No. 4-347131, to calculate the center and the radius of the pupil. After that, the MPU 1 calculates a rotation angle of the eyeball and performs its correction due to individual differences, by utilizing positions of the Purkinje image and the center of the pupil, and finally calculates the position of the view point on a focusing screen of the camera. If the position of the view point does not exist within the area where the position of the view point should exist within the ordinary image-taking picture field size for which a display in the finder is also taken into consideration, the visual axis detection is retried at the steps 103 and 102 in order.

After the completion of selecting the measuring points by the visual axis detection means, the MPU 1 reads the setting status of the image-taking picture field mode switch 9. If it detects a mode in which images are taken by using a part of an ordinary image-taking picture field such as the panorama mode and the HD mode, it checks an existence of any position of the view point outside the image-taking area in the image-taking picture field mode which has been set (the panorama mode or the HD mode) at the steps 103, 104, and 105 in order.

If a view point is found within the image-taking area as a result of it, the camera is controlled in a conventional sequence at the steps 105, 116, 117, and 118 in order.

Namely, the MPU 1 determines, so called, a distance measuring point and a photometry point with which a focus point is detected when an auto-focus operation is instructed before performing the auto-focus operation and an automatic exposure operation at the step 116.

Namely, the auto-focus operation will be performed in a following manner described below. The MPU 1 reads the signal corresponding to the distance measuring point determined by the sensor of the focus detection apparatus and calculates the driving amount of the objective lens by processing the above obtained signal.

Subsequently, the lens drive unit 6 is so controlled to move the objective lens to accomplish focus adjustment. Further, the MPU 1 calculates exposure constants such as a shutter speed, an aperture value and the like based on the signal from the photometry sensor in accordance with the designated image-taking mode.

After that, when release request is issued at the step 117, the aperture is driven to realize the aperture value calculated through the aperture drive unit 7, the shutter is opened or closed, and a series of operations with respect to a release such as winding up of a film will be performed at the step 118.

This operation is also performed at the steps 104, 116, 117 and 118 in order in the same manner described above under the ordinary image-taking mode in which the image is taken by partially utilizing the ordinary image-taking picture field under the panorama mode or the HD mode or the like.

On the other hand, if the view point exists outside the image-taking picture field, the image-taking picture field mode such as a panorama mode, an HD mode or the like set by the user is released at the step 106.

Then, a value of an internal counter CNT is counted up at the step 107. The internal counter CNT is initialized to zero when the user changes the image-taking picture field mode by utilizing the mode setting switch 9 and when the panorama mode or the HD mode is automatically released in accordance with the visual axis detection result of the camera which will be described later.

Then, the distance measuring point and the photometry point with which a focus detection is performed when the automatic focussing operation is instructed are determined. When AF and AE operations are required, AF operation and the photometry will be performed at the step 108.

As described above, the auto-focus operation will be performed in a following manner described below.

The MPU 1 reads the signal corresponding to the distance measuring point determined by the sensor of the focus detection apparatus and calculates the driving amount of the objective lens by processing the above obtained signal.

Subsequently, the lens drive unit 6 is so controlled to move the objective lens to accomplish focus adjustment. Further, the MPU 1 calculates exposure constants such as a shutter speed, an aperture value and the like based on the signal from the photometry sensor in accordance with the designated image-taking mode.

After that, when release request is issued at the step 109, the aperture is driven to realize the aperture value calculated through the aperture drive unit 7, the shutter is opened or closed, and a series of operations with respect to a release such as winding up of a film will be performed under the temporary release of the image-taking picture field mode set by the image-taking user at the step 110.

After terminating release related operations, the value of the internal counter CNT is compared with that of predetermined constant CONST. If CNT≦CONST, then the image-taking picture field mode is returned to the mode designated by the user at the steps 111 and 115 in order.

On the contrary, if CNT>CONST, then the image-taking picture field mode designated by the user is released and changed to the ordinary image-taking picture field size mode so that the counter CNT value is cleared to zero at the steps 111, 112 and 113 in order.

Then, the result is displayed to inform the user at the step 114. In this case, further image-taking operations will be performed by the ordinary image-taking picture field mode until when the panorama mode or the HD mode is designated again by the user to operate the mode setting switch 9.

Since the above described third embodiment is constituted such that, when the user instructs the release in case that the view point of the user on a focusing screen exists out of the picture field of the panorama mode or the HD mode, but exists within the image-taking picture field of the ordinary image-taking mode, and the panorama mode or the HD mode is set, the image is taken with the ordinary image-taking picture field mode and the image-taking picture field mode is returned to either the panorama mode or the HD mode after image-taking. Thus, it can be avoided that the main photographic object is partially absent due to negligence of the mode change by the user.

This also eliminates a troublesome operation that the user changes the picture field mode by having his eye departed from the finder of the camera.

Figure 9:
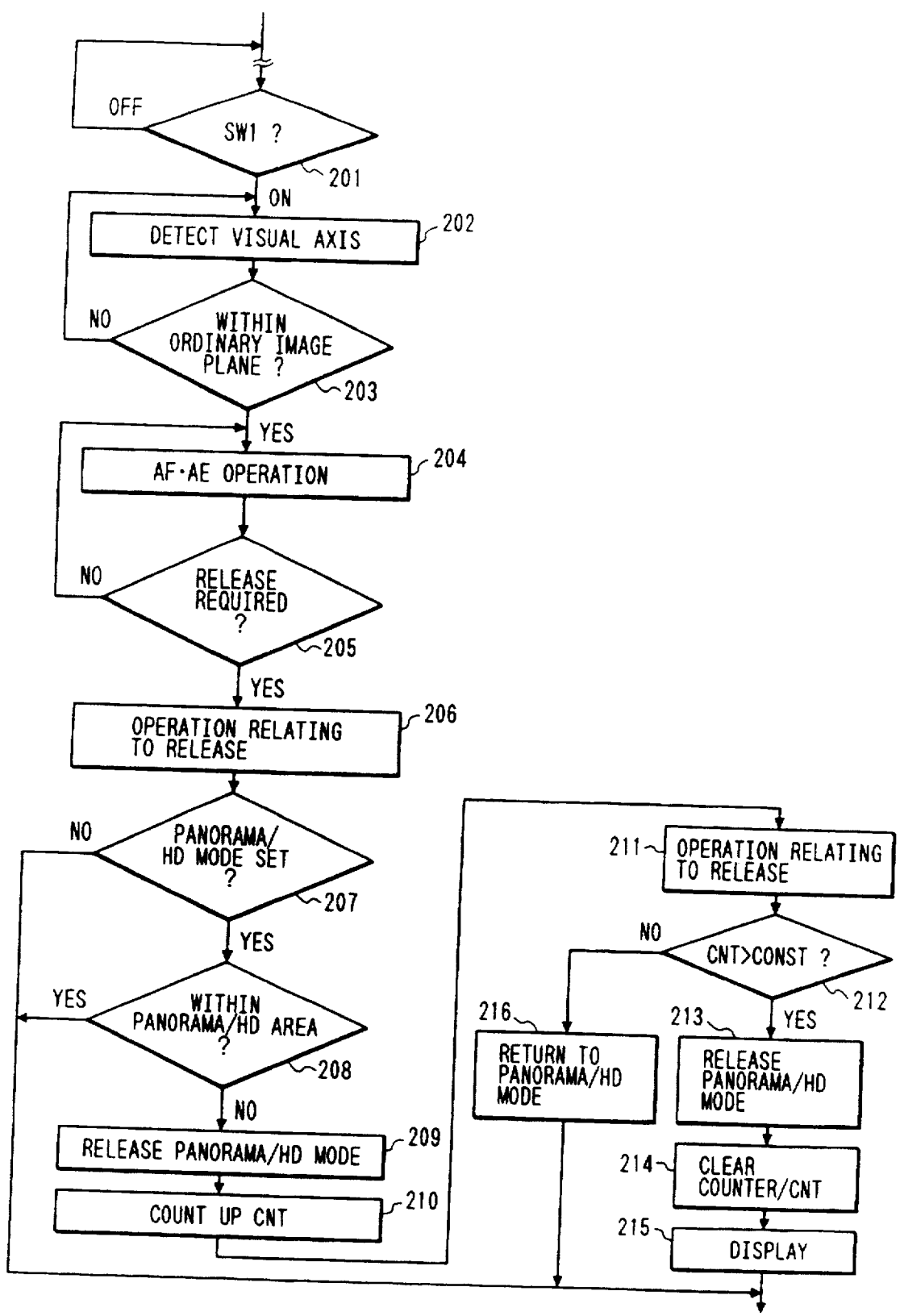
FIG. 9 is a flow chart illustrating an operation of a camera according to the fourth embodiment of the present invention.

FIG. 9 is a flow chart illustrating an operation of a camera which can change the image-taking picture field size according to the fourth embodiment of the present invention, a circuit structure of which is identical to that shown in FIG. 1 so that the detailed explanation will be omitted by using the same numerals to the corresponding circuit explanation.

When the switch SW1 which is turned on with the first stroke of a release button turns on at the step 201 in the same manner as for the third embodiment, the MPU 1 progresses to a routine having a series of operations such as automatic focusing, automatic exposure and the like for image-taking. At the beginning of the series of operations, the MPU 1 detects the visual axis of a user at the step 202.

First, an initialization procedure is performed to initialize variables utilized in calculation and then the MPU 1 sets the accumulation time of the CCD 4 taking into account whether glasses are worn or not and the intensity of the ambient light.

At the same time, in response to the position (vertical position or horizontal position) of the camera indicated by a position sensor (not shown), a light emitting diode which should be turned on by taking into account whether glasses are worn or not can be selected, followed by the accumulation control step of the CCD 4.

First, the MPU 1 instructs the driver circuit 3 to execute a clear mode operation. The driver circuit 3 which receives the instruction performs the clear operation to erase remaining electric charges in a memory zone of the CCD 4, a charge transfer line or the like.

Subsequently, the MPU 1 sends an IRED selective signal to the driver circuit 3 in order to turn on the selected light emitting diode and sets the accumulation signal so as to be high level. Then, with the lapse of the predetermined accumulation time, the accumulation signal turns into a low level so that the accumulation terminates. Thereafter the accumulation starts synchronized starts with turning on the light emitting diode.

Next, the MPU 1 executes the extraction procedure of the optical image block (Purkinje image candidate) and the pupil's edge candidate.

Namely, the MPU 1 reads the image signal one line by one line successively, performs an A/D conversion and stores its value into the memory 2.

The extraction procedure of the optical image block (Purkinje image candidate) and the pupil's edge candidate will be done by utilizing the above data. The MPU 1 performs the above procedure with a prescribed number of lines designated in the read-out area of the CCD 4.

After completion of the above procedure as to all the read-out lines, the Purkinje image and the pupil's edge are detected. Then, the center and the radius of the pupil are calculated by utilizing the detected pupil's edge.

After that, the MPU 1 calculates a rotation angle of the eyeball and performs its correction due to individual differences, by utilizing positions of the Purkinje image and the center of the pupil, and finally calculates the position of the view point on a focusing screen of the camera.

If the view point does not exist within the existing area where the view point should exist under the ordinary image-taking picture field size determined by taking into consideration the display in the finder, the visual axis detection is retried at steps 203 and 202 in order.

If the visual axis detection succeeds, the camera is controlled with the previous sequence without changing the image-taking picture field size.

Namely, AF operation and AE operation will be performed at the step 204 after determination of the distance measuring point and the photometry point with which a focus detection is performed when AF operation is instructed.

The auto-focus operation will be performed in a following manner described below. The MPU 1 reads the signal corresponding to the distance measuring point determined by the sensor of the focus detection apparatus and calculates the driving amount of the objective lens by processing the above obtained signal.

Subsequently, the lens drive unit 6 is so controlled to move the objective lens to accomplish focus adjustment. Further, the MPU 1 calculates exposure constants such as a shutter speed, an aperture value and the like based on the signal from the photometry sensor in accordance with the designated image-taking mode.

After that, when release request is issued at the step 205, the aperture is driven to realize the aperture value calculated through the aperture drive unit 7, the shutter is opened or closed, and a series of operations with respect to a release such as winding up of a film will be performed at the step 206. Then, the MPU 1 reads the setting condition of the setting switch 9.

If the panorama mode, the HD mode or the like which takes images by partially utilizing the ordinary image-taking picture field has been set, investigation is made as to whether the view point exists outside the image-taking picture field of the setting image-taking picture field mode (panorama mode, HD mode) at the steps 206, 207 and 208 in order.

In the result, if the view point exists within the picture field area, the series of sequences is terminated and the successive sequence for camera operation control is initiated.

On the contrary, if the view point exists outside the plane area, settings of the image-taking picture field mode (panorama mode, HD mode) set by the user are released at the step 209. Then, the internal counter CNT value is counted up at the step 210.

The internal counter CNT is initialized to zero when the user changes the image-taking picture field mode by utilizing the mode setting switch 9 and when the panorama mode or the HD mode is automatically released in accordance with the visual axis detection result of the camera which will be described later.

After that, a series of operations with respect to the release such as the aperture driving for achieving the calculated aperture value, the opening and closing of the shutter, the winding of films or the like are performed at the step 211 with the ordinary picture field size which is obtained by temporarily releasing the image-taking picture field mode set by the user.

After terminating release related operations, the value of the internal counter CNT is compared with that of predetermined constant CONST. If CNT≦CONST, then the image-taking picture field mode is returned to the mode designated by the user at the steps 212 and 216 in order.

On the contrary, if CNT>CONST, then the image-taking picture field mode designated by the user is released and changed to the ordinary image-taking picture field size mode so that the counter CNT is cleared to zero at the steps 212, 213 and 214 in order.

Then, the result is displayed to inform the user at the step 215. In this case, further image-taking operations will be performed by the ordinary image-taking picture field mode until the panorama mode or the HD mode is designated again by the user operating the mode setting switch 9.

Since the above described fourth embodiment is constituted such that, when the user instructs the release in case that the view point of the user on a focusing screen exists out of the picture field of the panorama mode or the HD mode, but exists within the image-taking picture field of the ordinary image-taking mode, and the panorama mode or the HD mode is set, the image is taken both with the ordinary image-taking picture field mode and the panorama mode (or the HD mode), and the image-taking picture field mode is returned to either the panorama mode or the HD mode after image-taking. It can be avoided in the same manner as the third embodiment, to have a failure in that the main photographic object is partially absent due to negligence of the mode change by the user.

This also eliminates a troublesome operation that the user changes the picture field mode by having his eye departed from the finder of the camera.

Figure 10:
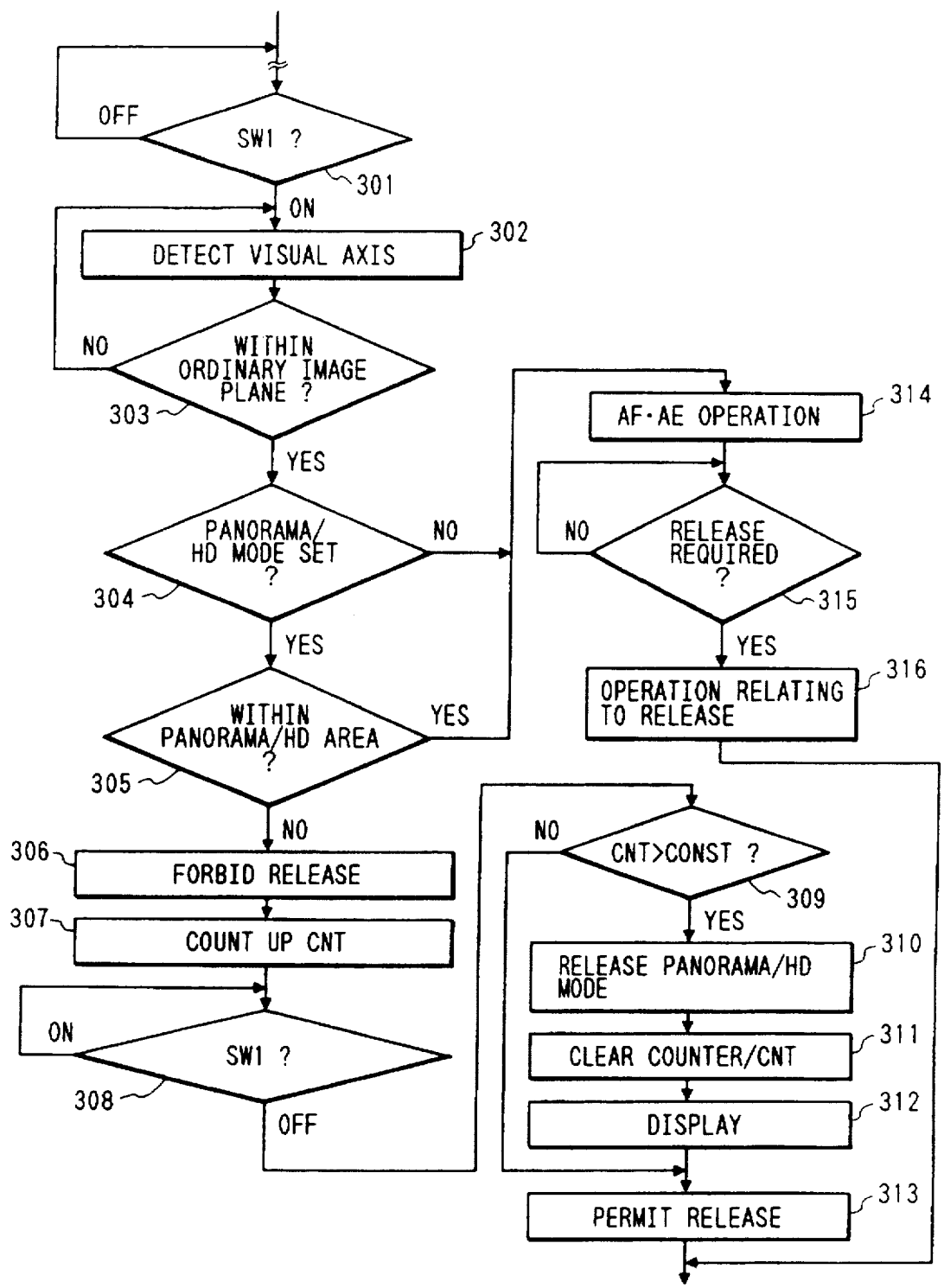
FIG. 10 is a flow chart illustrating an operation of a camera according to the fifth embodiment of the present invention.

FIG. 10 is a flow chart illustrating an operation of a camera which can change the image-taking picture field size according to the fifth embodiment of the present invention, a circuit structure of which is identical to that shown in FIG. 1 so that the detailed explanation will be omitted by using the same numerals to the corresponding circuit explanation.

When the switch SW1 which is turned on with the first stroke of a release button turns on at the step 301 in the same manner as for the third and fourth embodiments, the MPU 1 progresses to a routine having a series of operations such as automatic focussing, automatic exposure and the like for image-taking. At the beginning of the series of operations, the MPU 1 detects the visual axis of a user at the step 302.

First, an initialization procedure is performed to initialize variables utilized in calculation and then the MPU 1 sets the accumulation time of the CCD 4 taking into account whether glasses are worn or not and the intensity of the ambient light.

At the same time, in response to the position (vertical position or horizontal position) of the camera indicated by a position sensor (not shown), a light emitting diode which should be turned on by taking into account whether glasses are worn or not can be selected, followed by the accumulation control step of the CCD 4.

First, the MPU 1 instructs the driver circuit 3 to execute a clear mode operation. The driver circuit 3 which receives the instruction performs the clear operation to erase remaining electric charges in a memory zone of the CCD 4, a charge transfer line or the like.

Subsequently, the MPU 1 sends an IRED selective signal to the driver circuit 3 in order to turn on the selected light emitting diode and sets the accumulation signal so as to be high level. This starts the accumulation synchronized with turning on the light emitting diode.

Then, with the lapse of the predetermined accumulation time, the accumulation signal turns into a low level so that the accumulation terminates.

Next, the MPU 1 executes the extraction procedure of the optical image block (Purkinje image candidate) and the pupil's edge candidate.

First, the MPU 1 reads the image signal one line by one line successively by way of a driver circuit 3, performs an A/D conversion and stores its value into the memory 2.

The extraction procedure of the optical image block (Purkinje image candidate) and the pupil's edge candidate will be done by utilizing the above data. The MPU 1 performs the above procedure with a prescribed number of lines designated in the read-out area of the CCD 4.

After that, the MPU 1 calculates a rotation angle of the eyeball and performs its correction due to individual differences, by utilizing positions of the Purkinje image and the center of the pupil, and finally calculates the position of the view point on a focusing screen of the camera.

If the view point does not exist within the existing area where the view point should exist under the ordinary image-taking plane size determined by taking into consideration the display in the finder, the visual axis detection is retried at steps 303 and 302 in order.

After completion of the selection of the distance measuring point by the visual axis detection means, the setting condition of the mode setting switch 9 is read out. If the panorama mode, the HD mode or the like which takes images by partially utilizing the ordinary image-taking picture field has been set, investigation is made as to whether the view point exists outside the image-taking picture field of the setting image-taking picture field mode (panorama mode, HD mode) at the steps 303, 304 and 305.

In the result, if the view point exists within the picture field area, the camera is controlled with the previous sequence at the steps 305, 314, 315 and 316.

Namely, AF operation and AE operation will be performed at the step 314 after determination of the distance measuring point and the photometry point with which a focus detection is performed when AF operation is instructed.

Namely, the auto-focus operation will be performed in a following manner described below. The MPU. 1 reads the signal corresponding to the distance measuring point determined by the sensor of the focus detection apparatus and calculates the driving amount of the objective lens by operating the above obtained signal.

Subsequently, the lens drive unit 6 is so controlled to move the objective lens to accomplish focus adjustment. Further, the MPU 1 calculates exposure constants such as a shutter speed, an aperture value and the like based on the signal from the photometry sensor in accordance with the designated image-taking mode.

After that, when release request is issued at the step 315, the aperture is driven to realize the aperture value calculated through the aperture drive unit 7, the shutter is opened or closed, and a series of operations with respect to a release such as winding up of a film will be performed at the step 316.

On the other hand, if the view point exists outside the picture field area, the release operation is prohibited at the step 306. This can be done as follows.

The release prohibited period is, for example, confirmed by checking flags or the like and the release signal is not output to the shutter unit 8 and the like even though the turn-on signal of the switch SW2 which is turned on by the second stroke of the release button is input to the MPU 1.

Then, the internal counter CNT value is counted up at the step 307. The internal counter CNT value is initialized to zero when the user changes the image-taking picture field mode by utilizing the mode setting switch 9 and when the panorama mode or the HD mode is automatically released in accordance with the visual axis detection result of the camera which will be described later.

Then, after turning off the switch 1 at the step 308, the value of the internal counter CNT is compared with that of a predetermined constant CONT. If CNT>CONT, then the image-taking picture field mode designated by the user is released and changed to the ordinary image-taking picture field size mode at the step 310 so that the counter CNT value is cleared to zero at the step 311. Then, the result is displayed to inform the user at the step 312.

After that, the release prohibited condition is released at the step 313. In this case, further image-taking operations will be performed with the ordinary image-taking picture field mode until when the panorama mode or the HD mode is designated again by the user operating the mode setting switch 9.

Since the above described fifth embodiment is constituted such that, when the user instructs the release in case that the view point of the user on a focusing screen exists out of the picture field of the panorama mode or the HD mode, but exists within the image-taking picture field of the ordinary image-taking mode, and the panorama mode or the HD mode is set, the release is prohibited, similar advantages to the third or the fourth embodiments can be achieved.

Figure 11:
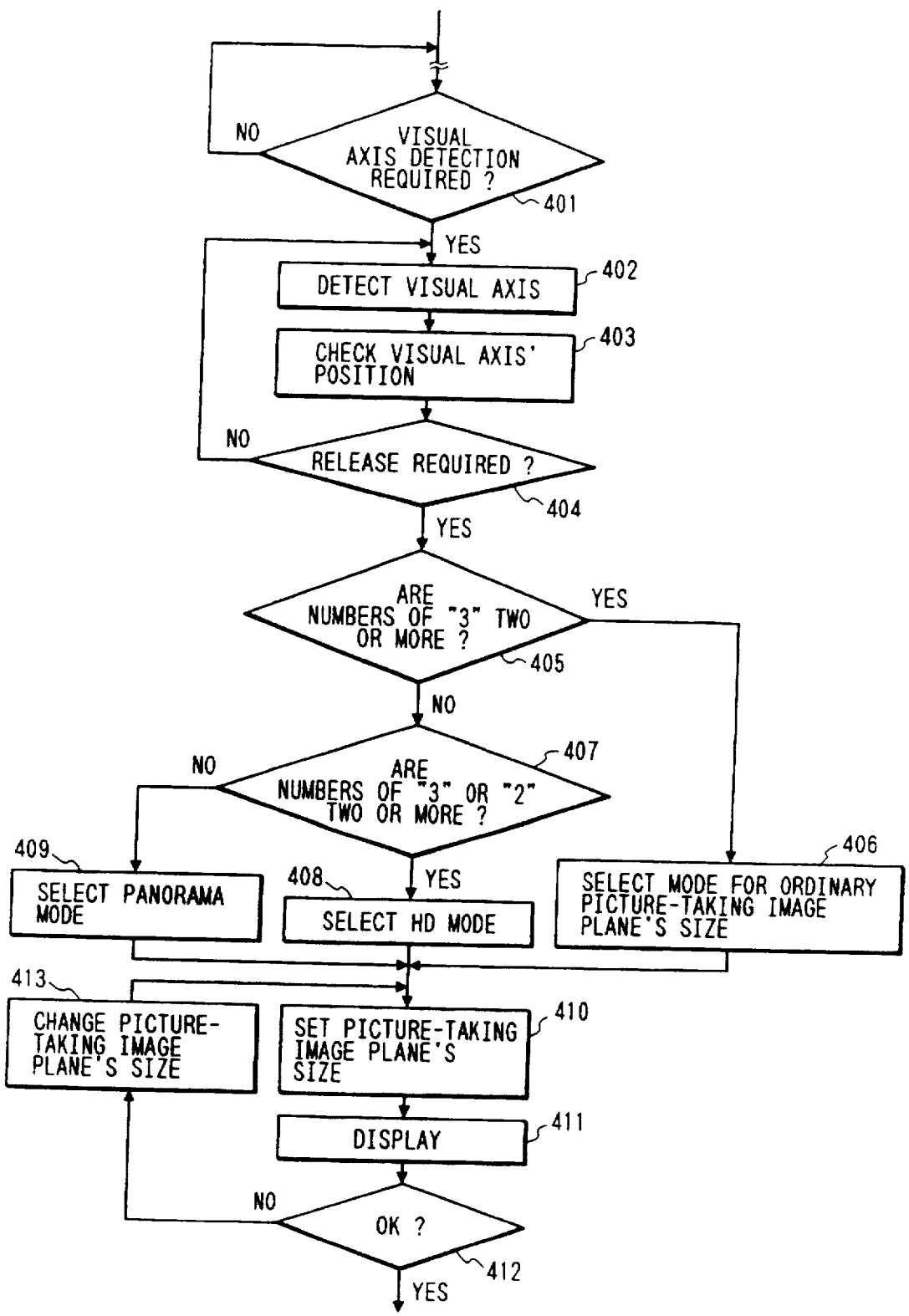
FIG. 11 is a flow chart illustrating an operation of a camera according to the sixth embodiment of the present invention.

FIG. 11 is a flow chart illustrating an operation of a camera which can change the image-taking picture field size according to the sixth embodiment of the present invention, a circuit structure of which is identical to that shown in FIG. 1 so that the detailed explanation will be omitted by using the same numerals to the corresponding circuit explanation.

When the visual axis detection is required by turning on a main switch of the camera or by turning on the switch SW1 by release button at the step 401, the MPU 1 progresses to the visual axis detection routine to perform the visual axis detection as follows at the step 402.

First, an initialization procedure is performed to initialize variables utilized in calculation and then the MPU 1 sets the accumulation time of the CCD 4 taking into account whether glasses are worn or not and the strength of outer light.

At the same time, in response to the position (vertical position or horizontal position) of the camera indicated by a position sensor (not shown), a light emitting diode which should be turned on by taking into account whether glasses are worn or not can be selected, followed by the accumulation control step of the CCD 4.

First, the MPU 1 instructs the driver circuit 3 to execute a clear mode operation. The driver circuit 3 which receives the instruction performs the clear operation to erase remaining electric charges in a memory zone of the CCD 4, a charge transfer line or the like.

Subsequently, the MPU 1 sends an IRED selective signal to the driver circuit 3 in order to turn on the selected light emitting diode and sets the accumulation signal so as to be high level. This starts the accumulation synchronized with turning on the light emitting diode.

Then, with the lapse of the predetermined accumulation time, the accumulation signal turns into a low level so that the accumulation terminates.

Next, the MPU 1 executes the extraction procedure of the optical image block (Purkinje image candidate) and the pupil's edge candidate.

First, the MPU 1 reads the image signal one line by one line successively by way of a driver circuit 3, performs an A/D conversion and stores its value into the memory 2.

The extraction procedure of the optical image block (Purkinje image candidate) and the pupil's edge candidate will be done by utilizing the above data. The MPU 1 performs the above procedure with a prescribed number of lines designated in the read-out area of the CCD 4.

After completion of the above procedure as to all the read-out lines, the Purkinje image and the pupil's edge are detected. Then, the center and the radius of the pupil are calculated by utilizing the detected pupil's edge.

A method of least squares can be utilized, as disclosed, for example, in Japanese Patent Laid-Open Application No. 4-347131, to calculate the center and the radius of the pupil.

After that, the MPU 1 calculates a rotation angle of the eyeball and performs its correction due to individual differences, by utilizing positions of the Purkinje image and the center of the pupil, and finally calculates the position of the view point on a focusing screen of the camera at step 403.

Figure 12:
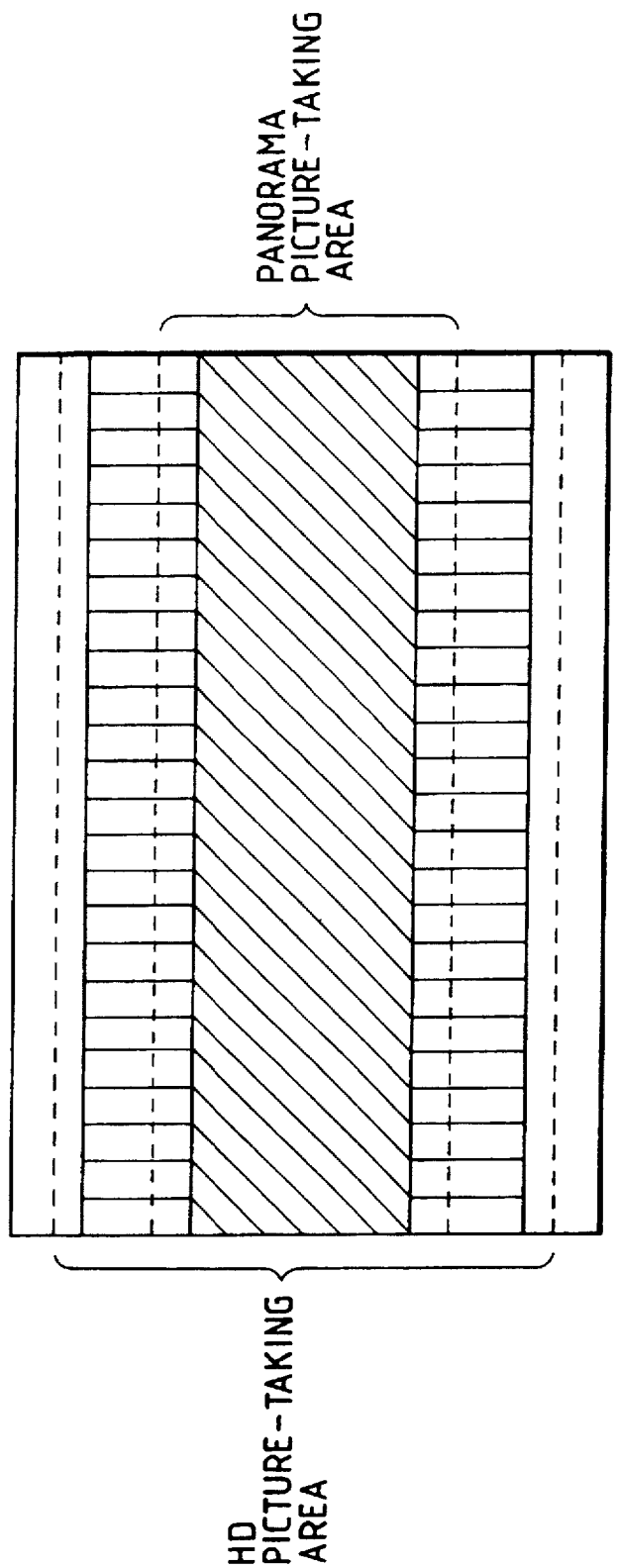
FIG. 12 is an explanatory view illustrating the relationship between a distribution of visual axis and a selection of image-taking picture field in the sixth embodiment of the present invention.

The MPU 1 repeats the above-described operation until the release operation is requested (namely, the switch SW2 is turned on). As shown in FIG. 12, whenever detecting a visual axis, the MPU 1 determines whether the image-taking range of the view point detected is a panorama mode, an HD mode, or an ordinary mode (in steps 404, 402, 403, 404 and 403 . . . in order).

The MPU 1 stores the determined result in the memory 2. For example, when the view point is in a hatched line region in FIG. 12, "1" is stored in the memory 2; when the view point is in a vertical line region in FIG. 12, "2" is stored in the memory 2; and when the view point is out of both the hatched line region and vertical line region in FIG. 12, "3" is stored in the memory 2. When the number of times of the repetition of the operation exceeds a predetermined number, the result at this time is substituted for the oldest data stored in the memory 2. Only the view point ranges of the latest predetermined number of operations are stored in the memory 2.

Thus, unnecessary view point information can be prevented from being used for calculations by employing long-time detection.

The view point ranges corresponding to the image-taking range modes shown in FIG. 12 are more inwardly set than their image-taking ranges.

When the release operation is requested, the MPU 1 selects an image-taking range corresponding to partial data of view points stored in the memory 2 (in steps 404 and 405 in order).

First, the MPU 1 counts the numbers of "2" and "3" stored in the memory 2. When the numbers of "3" is n or more (n is set corresponding to a predetermined number of time that the operation is validly performed or the like). The MPU 1 selects the ordinary image-taking picture field size mode (in steps 405 and 406 in order). When a total numbers of "3" and "2" is n or more, the MPU 1 selects the HD mode (in steps 405, 407, 408 in order). Otherwise, the MPU 1 selects the panorama mode (in steps 405, 407, 409 in order). The MPU 1 sets the image-taking picture field size corresponding to the selected mode (at step 410).

Thereafter, the MPU 1 displays the set mode in the finder or the like so that the user can know that the mode has been changed (at step 411).

When the user (photographer) has determined that the present setting is proper (for example, the switch SW2 is kept on), the MPU 1 advances to a release sequence (determined result at step 412 is YES).

When the user has determined that the present setting is improper (for example, the switch SW2 is turned off), the MPU 1 changes the image-taking picture field size (in steps 412 and 413 in order). When the panorama mode or the ordinary image-taking picture field size has been designated, the MPU 1 changes the panorama mode to the HD mode. In the HD mode, the MPU 1 checks the view point range stored in the memory 2. When the memory 2 stores "3", the MPU 1 selects the ordinary image-taking picture field size. When the memory 2 does not store "3", the MPU 1 selects the panorama mode. After the mode has been changed, the MPU 1 informs the user of the mode change. The MPU 1 waits for request of the release operation (in steps 413, 410, 411 and 412 in order).

According to the sixth embodiment, a visual axis is repeatedly detected until the release operation is requested. The number of times that the visual axis is present in the regions of the panorama mode, the HD mode, the ordinary image-taking picture field mode is obtained (a distribution of number of times that the visual axes is present is obtained). According to this result, the image-taking picture field size is set. The MPU 1 informs the user of the image-taking picture field size by indication, alarm sound, and so forth. When the user determines that the informed image-taking picture field size is improper, the MPU 1 automatically changes the image-taking picture field size. Thus, the same effect as the third to fifth embodiment can be accomplished.

According to the above embodiments, as a result of the visual axis detection, if a release operation is instructed by a user when a view point of the user on a focusing screen exists both outside of an image-taking area of panorama mode (or HD mode) and within an image-taking area of an ordinary image-taking mode and a panorama mode (or HD mode) is set.

1) the MPU 1 takes an image by the ordinary image-taking mode. After the image has been taken, the MPU 1 changes the image-taking mode to the panorama mode (or HD mode) (third embodiment).

2) the MPU 1 takes image both in the ordinary image-taking mode and the panorama mode (or HD mode). After the images have been taken, the MPU 1 changes the image-taking mode to the panorama mode (or HD mode) (fourth embodiment).

3) the MPU 1 prohibits the release operation (fifth embodiment).

4) the MPU 1 repeatedly performs the visual axis detection until the release operation is requested.

The MPU 1 determines how many times the visual axis is present in each of the panorama mode, the HD mode, and the ordinary image-taking mode. According to the result, the MPU 1 sets the image-taking picture field size. The MPU 1 informs the user of this image-taking picture field size by indication, alarm sound, and so forth. When the user accepts the image-taking picture field size, the MPU 1 automatically selects this image-taking picture field size (sixth embodiment).

Thus, even if the user forgets to change the image-taking mode, a part of an image of a subject is prevented from disappearing.

Consequently, when changing the image-taking picture field size, since the user does not need to operate image-taking picture field size selector switch, dial, or the like (which is the image-taking mode setting switch 9 in this embodiment), the camera according to this embodiment can become easy to operate.

Figure 13:
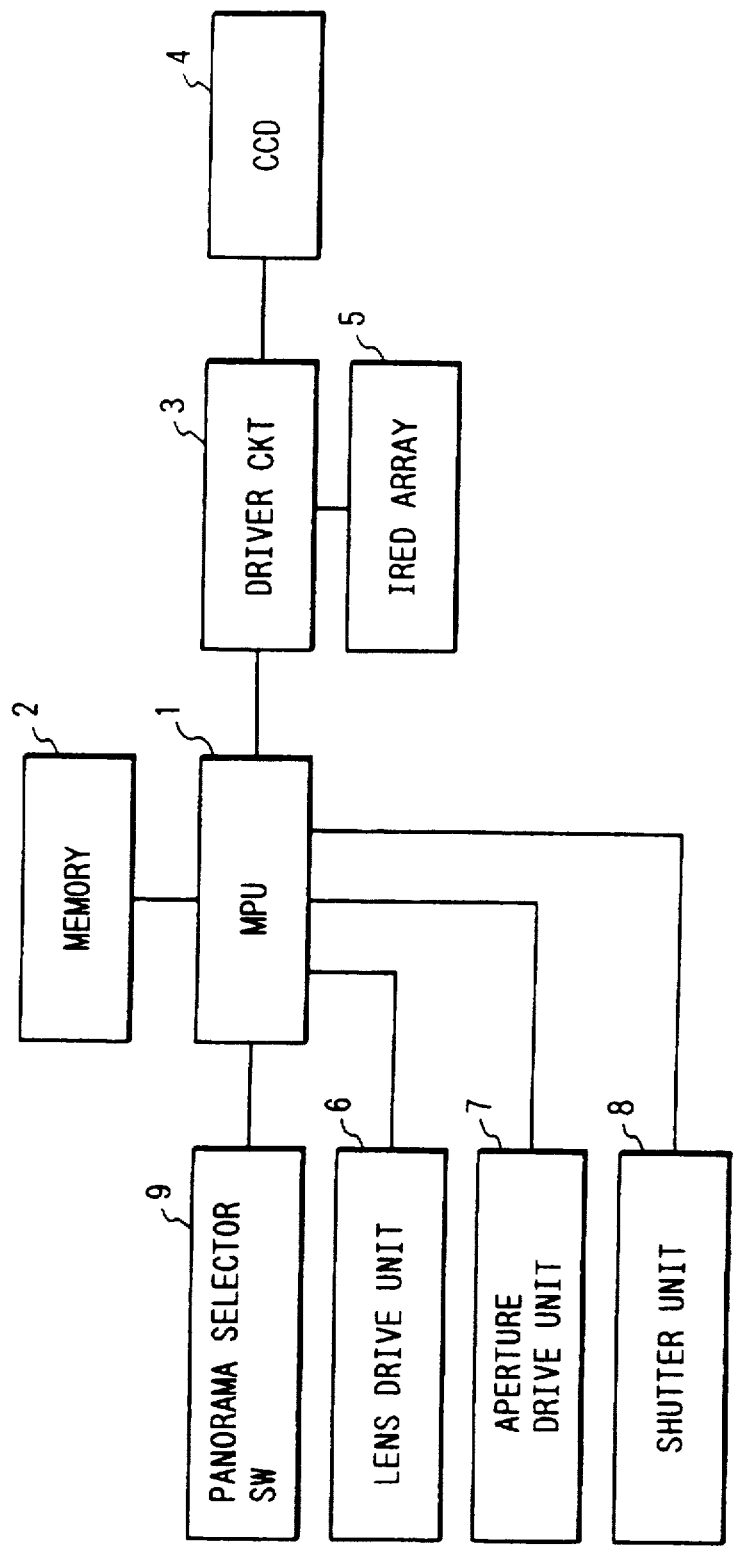
FIG. 13 is a block diagram illustrating a structure according to the seventh embodiment of the present invention.

FIG. 13 is a block diagram showing constructional portions of the camera main body of the seventh embodiment. In this drawing, numeral 1 is an MPU (Micro Processor Unit). Numeral 2 is a memory. Numeral 3 is a drive circuit for a CCD and an IRED (Infrared Ray Emitting Diode). Numeral 4 is a CCD that receives an image of a forward eye portion. Numeral 5 is an IRED array constructed of a plurality of IREDs. Numeral 6 is a lens drive unit for AF (Auto Focus) operation. Numeral 7 is an aperture drive unit. Numeral 8 is a shutter unit. Numeral 9 is an image-taking picture field size setting switch (namely panorama changingover switch).

An image signal obtained from the image sensor is processed so as to obtain the visual axis of the user. Since the image signal detection and processing method used in this embodiment is disclosed in Japanese Patent Laid-Open Application Nos. 1-274736 and 4-347131, the method is briefly described hereinafter. However, the detailed explanation is omitted since the method relates to well-known art.

When the eyeball of an image-taking user (photographer) is illuminated by parallel light (or divergent light) from a light emitting diode, the light is reflected by the front end of the cornea to produce an imaginary image of the light emitting diode. This imaginary image is called a Purkinje image, the production position of which coincides with the center of the pupil in case that a rotation angle of the eyeball is zero. With the rotation of the eyeball, a distance between the Purkinje image and the center of the pupil is expanded in approximate proportion to the sine of the rotation angle. Accordingly, the rotation angle of the eyeball and further also the view point of the user can be known by detecting the position of the Purkinje image and the center of the pupil based on the video image signals from the CCD 4 and thereafter calculating the distance therebetween. Even though the head moves relative to the camera, the view point stays at the same location in a focusing screen due to the optical characteristics of the finder of the camera if the rotation angle of the eyeball is the same.

Figure 14:
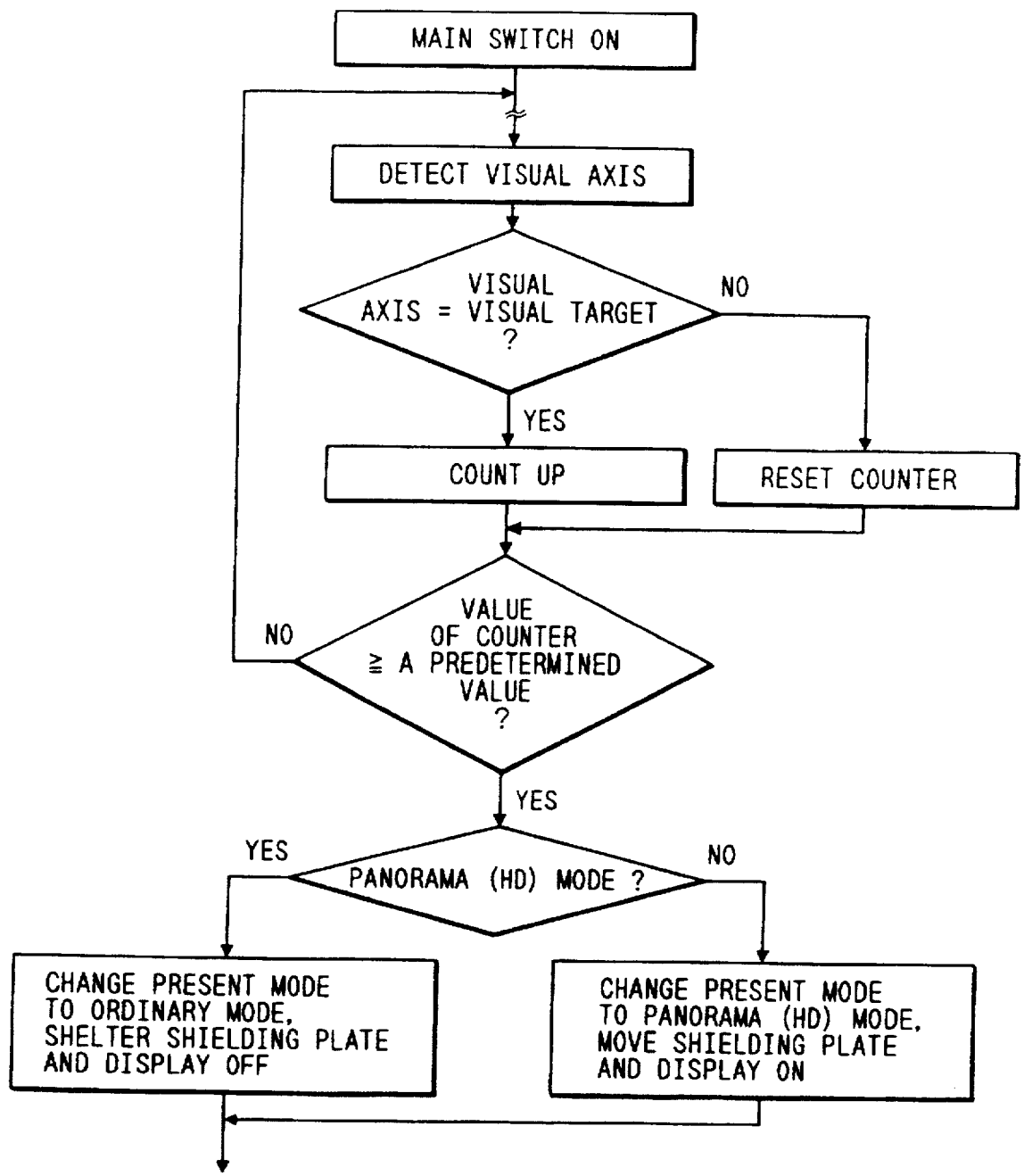
FIG. 14 is a flow chart illustrating process steps of an operation according to the seventh embodiment of the present invention.

Next, with reference to FIGS. 13 and 14, the operation of the present invention will be described. FIG. 14 is a flow chart showing the seventh embodiment of the present invention.

When the main switch is turned on, the MPU 1 progresses to a routine having a series of operations such as barrier releasing and displaying for preparation for image-taking. In the series of operations, the MPU 1 detects the visual axis of a user for setting an image-taking picture field size.

This is employed in the following manner by utilizing a visual axis detection circuit. First, an initialization procedure is performed to initialize variables utilized in calculation and then the MPU 1 sets the accumulation time of the CCD 4 taking into account whether glasses are worn or not and the intensity of the ambient light.

At the same time, in response to the position (vertical position or horizontal position) of the camera indicated by a position sensor (not shown), a light emitting diode which should be turned on can be selected, followed by the accumulation control step of the CCD 4. First, the MPU 1 instructs the CCD driver to execute a clear mode operation. The CCD driver which receives the instruction performs the clear operation to erase remaining electric charges in a memory zone of the CCD 4, a charge transfer line or the like.

Subsequently, the MPU 1 sends an IRED selective signal to the CCD driver in order to turn on the selected light emitting diode and sets the accumulation signal so as to be high level. This starts the accumulation synchronized with turning on the light emitting diode. Then, with the lapse of the predetermined accumulation time, the accumulation signal turns into a low level so that the accumulation terminates.

Next, the MPU 1 executes the extraction procedure of the optical image block (Purkinje image candidate) and the pupil's edge candidate.

First, the MPU 1 reads the image signal one line by one line successively from the CCD 4 via the CCD driver, performs an A/D conversion and stores its value into the memory 2.

The extraction procedure of the optical image block (Purkinje image candidate) and the pupil's edge candidate is done by utilizing the above data. The MPU 1 merely performs the above procedure with a number of lines designated in the read-out area of the CCD.

After completion of the above procedure as to all the read-out lines, the Purkinje image and the pupil's edge are detected. Then, the center and the radius of the pupil are calculated by utilizing the detected pupil's edge.

A method of least squares can be utilized, as disclosed, for example, in Japanese Patent Laid-Open Application No. 4-347131, to calculate the center and the radius of the pupil.

After that, the MPU 1 calculates a rotation angle of the eyeball and performs its correction due to individual differences, by utilizing positions of the Purkinje image and the center of the pupil, and finally calculates the position of the view point on a focusing screen of the camera.

When the view point is not present in the view point position range of the ordinary image-taking picture field size considering the display in the finder, the MPU 1 repeats the visual axis detecting operation.

When the view point position has been obtained by the visual axis detection means, the MPU 1 compares the view position with the size selection mark position for changing the panorama (HD) mode and the ordinary image-taking mode. The mark may be a dedicated mark P disposed outside the image-taking view field (view field equivalent to a field of photosensitive material) shown in FIG. 15.

When the view point position is present near the P mark (for example, in the region surrounded by a dotted line of FIG. 15), the MPU 1 increments the counter by 1. On the other hand, when the view point position is not present near the P mark, the MPU 1 resets the counter to zero. The MPU 1 compares a numeric value of CNT. of the counter with that of a predetermined constant CONST. When CNT.>CONST. (namely, the number of times that the view point position is present near the P mark exceeds a predetermined number in a given time period), the MPU 1 enters a routine for changing the ordinary image-taking picture field size mode to the panorama (HD) mode. At this point, the MPU 1 resets the counter to zero. When CNT.<CONST. (namely, the number of times that the view point position is present near the P mark does not reach the predetermined number), the MPU 1 returns to a routine for setting the image-taking picture field size.

The MPU 1 repeats this process until the image-taking picture field size is set.

When the MPU 1 enters the routine for changing the ordinary image-taking picture field size mode to the panorama (HD) size mode, the MPU 1 checks what image-taking screen size has been set. When the ordinary image-taking size mode has been set, the MPU 1 selects the panorama (HD) mode. Thus, the shielding plate is moved corresponding the panorama (HD) mode. For example, display in a finder unshown (for example, dispaly as to shielding in an upper or lower direction in the drawing paper by insertion of a blade and lighting up a mark of "Panorama") is employed. On the other hand, when the panorama (HD) mode has been set, the MPU 1 changes the panorama (HD) mode to the ordinary image-taking picture field size mode. For example, the shielding plate is removed corresponding to the ordinary image-taking picture field size mode. For example, the upper and lower shielding in the finder is released and the Panorama mark is lit off.

When necessary, the MPU 1 changes the image-taking screen size corresponding to the output of the visual axis (until the SW1 is turned on by the release button and thereby the AF operation or the like is requested).

Figure 16:
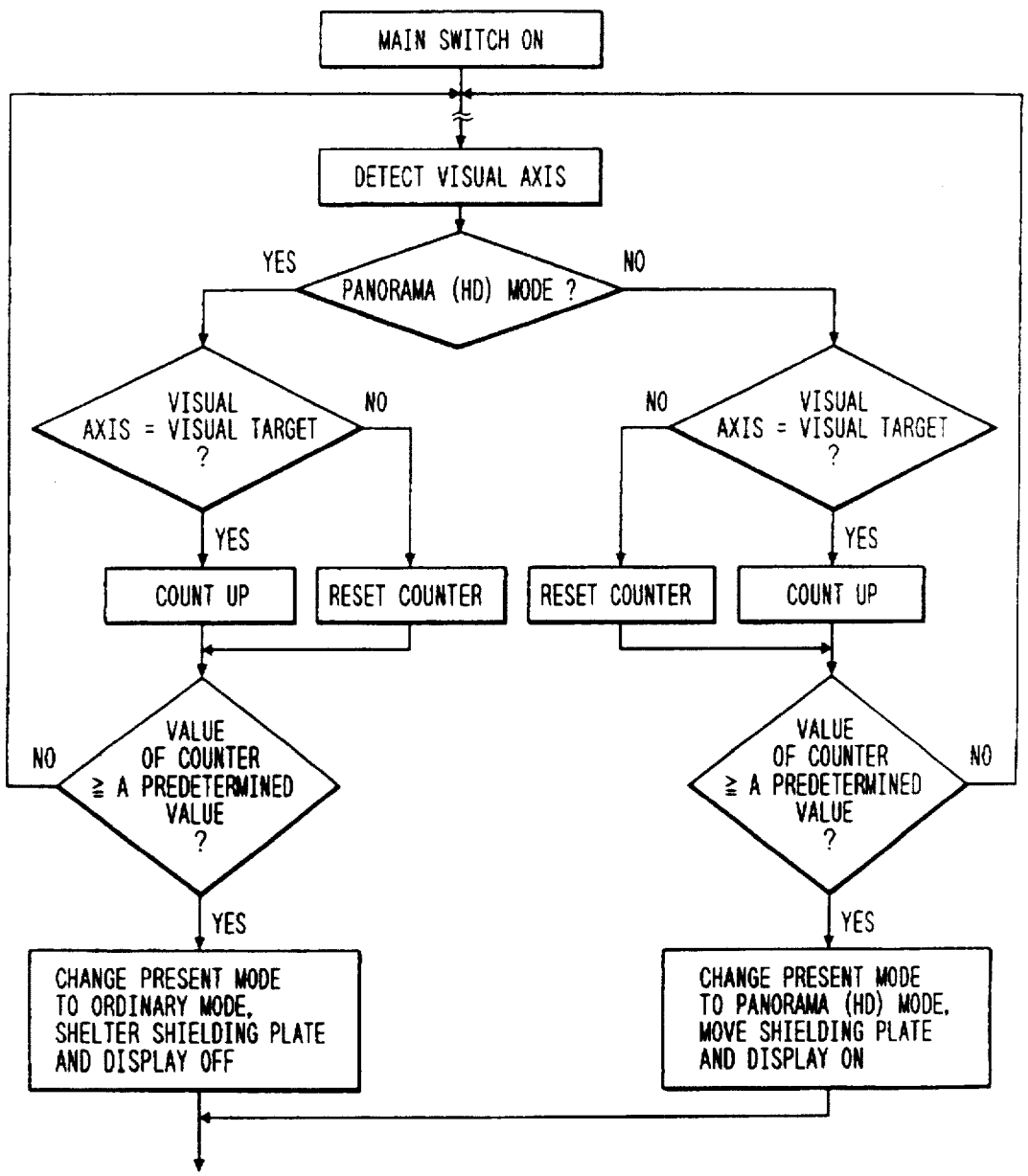
FIG. 16 is a flow chart illustrating an operation according to the eighth embodiment of the present invention.
Figure 18:
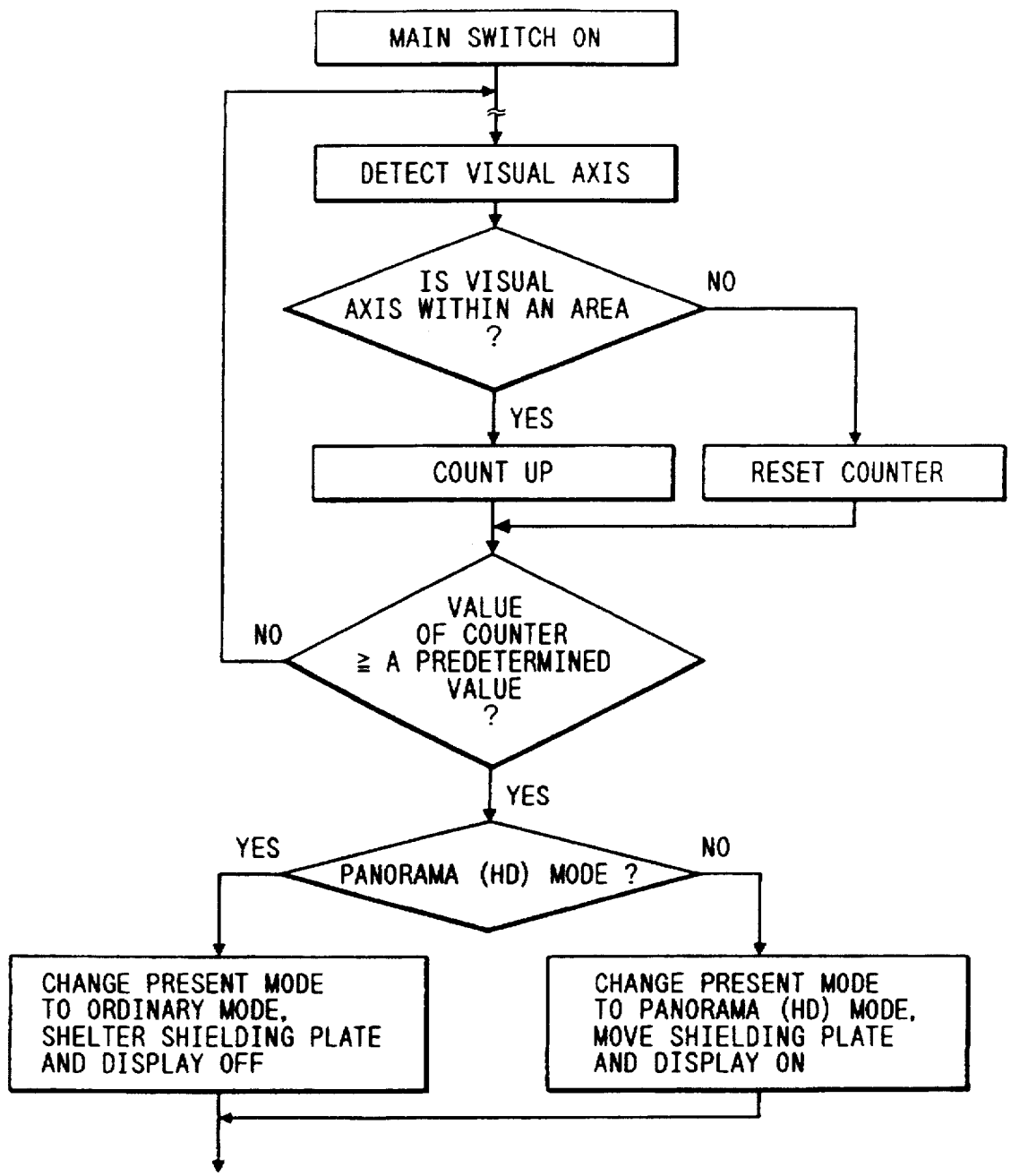
FIG. 18 is a flow chart illustrating an operation according to the ninth embodiment of the present invention.

With reference to FIG. 13 (block diagram) and FIG. 16, a camera according to the eighth embodiment of the present invention will be described. FIG. 16 is a flow chart showing an operation of the camera of the eighth embodiment.

When the main switch is turned on in the same manner as the seventh embodiment, the MPU 1 progresses to a routine having a series of operations such as barrier releasing and displaying for preparation for image-taking. In the series of operations, the MPU 1 employs the visual axis detection of a user for setting an image-taking picture field size.

This is done in a following manner by utilizing a visual axis detection circuit. First, an initialization procedure is performed to initialize variables utilized in calculation and then the MPU 1 sets the accumulation time of the CCD 4 taking into account whether glasses are worn or not and the intensity of the ambient light.

At the same time, in response to the position (vertical position or horizontal position) of the camera indicated by a position sensor (not shown), a light emitting diode which should be turned on by taking into account whether glasses are worn or not can be selected, followed by the accumulation control step of the CCD 4. First, the MPU 1 instructs the CCD driver to execute a clear mode operation. The CCD driver which receives the instruction performs the clear operation to erase remaining electric charges in a memory zone of the CCD 4, a charge transfer line or the like.

Subsequently, the MPU 1 sends an IRED selective signal to the CCD driver in order to turn on the selected light emitting diode and sets the accumulation signal so as to be high level. This starts the accumulation synchronized with turning on the light emitting diode. Then, with the lapse of the predetermined accumulation time, the accumulation signal turns into a low level so that the accumulation terminates.

Next, the MPU 1 executes the extraction procedure of the optical image block (Purkinje image candidate) and the pupil's edge candidate.

First, the MPU 1 reads the image signal one line by one line successively from the CCD 4 via the CCD driver, performs an A/D conversion and stores its value (data) into the memory 2.

The extraction procedure of the optical image block (Purkinje image candidate) and the pupil's edge candidate will be done by utilizing the above data. The MPU 1 performs the above procedure with a prescribed number of lines designated in the read-out area of the CCD 4.

After completion of the above procedure as to all the read-out lines, the Purkinje image and the pupil's edge are detected. Then, the center and the radius of the pupil are calculated by utilizing the detected pupil's edge.

A method of least squares can be utilized, as disclosed, for example, in Japanese Patent Laid-Open Application No. 4-347131, to calculate the center and the radius of the pupil.

After that, the MPU 1 calculates a rotation angle of the eyeball and performs its correction or the like due to individual differences, by utilizing positions of the Purkinje image and the center of the pupil, and finally calculates the position of the view point on a focusing screen of the camera.

When this view point is not present in the view point position range of the ordinary image-taking picture field size considering the display in the finder, the MPU 1 repeats the visual axis detecting operation.

When the view point position has been obtained by the visual axis detection means, the MPU 1 compares the view position with the size selection mark position of the panorama (HD) mode and ordinary image-taking picture field size. The mark may be a specific mark disposed outside the image-taking view field in the finder shown in FIG. 17.

Figure 17:
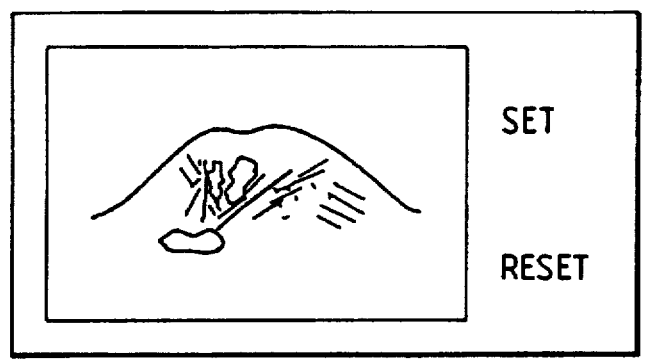
FIG. 17 is an explanatory view illustrating a mark (character) for changing a size of a picture field according to the eighth embodiment of the present invention.

When the ordinary image-taking mode been set, if the view point position is present near SET mark shown in FIG. 17, the MPU 1 increments the numerical value of a counter by 1. On the other hand, when the view position is not present near the SET mark, the MPU 1 resets the counter to zero. The MPU 1 compares a numeric value CNTs of the counter with a constant CONSTs. When CNTs≧CONSTs (namely, the ordinary image-taking picture field size has been set), if the number of times that the view point position is present near the SET mark equals to or exceeds a predetermined number, the MPU 1 enters a routine for changing the ordinary image-taking picture field size mode to the panorama (HD) mode. At this point, the MPU 1 resets the counter to zero. When CNTs<CONSTs (namely, the number of times that the view point position is present near the SET mark does not equal and exceed the predetermined number), the MPU 1 returns to a routine for setting the image-taking picture field size.

When the panorama (HD) mode has been set, if the view point position is present near a RESET mark shown in FIG. 17, the MPU 1 increments the numerical value of the counter by one. In contrast, when the view point position is not present near the RESET mark, the MPU 1 resets that of the counter to zero. The MPU 1 compares the numeric value CNTr of the counter with a predetermined constant CONSTr. When CNTr≧CONSTr (namely, the number of times that the view point position is present near the RESET mark equals or exceeds a predetermined value, the MPU 1 advances to a routine for changing the panorama (HD) mode to the ordinary image-taking picture field mode. At this point, the MPU 1 resets the counter to zero. In contrast, when CNTr<CONSTr (namely, the number of times that the view point position is present near the RESET mark does not equal and exceed the predetermined value, the MPU 1 returns to the routine for detecting the visual axis so as to set the image-taking picture field size.

The MPU 1 repeats this process until the image-taking picture field size is set.

When the MPU 1 enters the routine for changing the ordinary image-taking picture field size mode to the panorama (HD) mode, the MPU 1 selects the panorama (HD) mode. Thus, the shielding plate is moved corresponding the panorama (HD) mode. Display in a finder unshown (for example, display as to shielding in an upper or lower direction in the drawing paper by insertion of a blade and lighting up a mark of "Panorama") is employed.

On the other hand, when the MPU 1 enters the routine for changing the panorama (HD) mode to the ordinary image-taking picture field size mode, the MPU 1 selects the ordinary image-taking picture field size mode. For example, the shielding plate is removed corresponding to the ordinary image-taking mode. For example, the upper and lower shielding portions in the finder is released and the Panorama mark is lit off.

When necessary, the MPU 1 continues to change the image-taking picture field size corresponding to the output of the visual axis (until the SW1 is turned on by the release button and thereby the AF operation or the like is requested).

With reference to FIG. 14 (block diagram) and FIG. 19, a camera according to the ninth embodiment will now be described.

When the main switch is turned on in the same manner as for the eighth embodiment, the MPU 1 progresses to a routine having a series of operations such as barrier releasing and displaying for preparation for image-taking. In the series of operations, the MPU 1 detects the visual axis of a user for setting an image-taking picture field size.

This is done in a following manner by utilizing a visual axis detection circuit. First, an initialization procedure is performed to initialize variables utilized in calculation and then the MPU 1 sets the accumulation time of the CCD 4 taking into account whether glasses are worn or not and the intensity of the ambient light.

At the same time, in response to the position (vertical position or horizontal position) of the camera indicated by a position sensor (not shown), a light emitting diode which should be turned on by taking into account whether glasses are worn or not can be selected, followed by the accumulation control step of the CCD 4. First, the MPU 1 instructs the CCD driver to execute a clear mode operation. The CCD driver which receives the instruction performs the clear operation to erase remaining electric charges in a memory zone of the CCD 4, a charge transfer line or the like.

Subsequently, the MPU 1 sends an IRED selective signal to the CCD driver in order to turn on the selected light emitting diode and sets the accumulation signal so as to be high level. This starts the accumulation synchronized with turning on the light emitting diode. Then, with the lapse of the predetermined accumulation time, the accumulation signal turns into a low level so that the accumulation terminates.

Next, the MPU 1 executes the extraction procedure of the optical image block (Purkinje image candidate) and the pupil's edge candidate.

First, the MPU 1 reads the image signal one line by one line successively from the CCD 4 via the CCD driver, performs an A/D conversion and stores its value into the memory 2.

The extraction procedure of the optical image block (Purkinje image candidate) and the pupil's edge candidate will be done by utilizing the above data. The MPU 1 performs the above procedure with a prescribed number of lines designated in the read-out area of the CCD 4.

After completion of the above procedure as to all the read-out lines, the Purkinje image and the pupil's edge are detected. Then, the center and the radius of the pupil are calculated by utilizing the detected pupil's edge.

A method of least squares can be utilized, as disclosed, for example, in Japanese Patent Laid-Open Application No. 4-347131, to calculate the center and the radius of the pupil.

After that, the MPU 1 calculates a rotation angle of the eyeball and performs its correction due to individual differences, by utilizing positions of the Purkinje image and the center of the pupil, and finally calculates the position of the view point on a focusing screen of the camera.

When this view point is not present in the view point position range of the ordinary image-taking picture field size considering the display in the finder, the MPU 1 repeats the visual axis detecting operation.

When the view point position has been set by the visual axis detection means, the MPU 1 compares the view position with a size selection mark position of the panorama (HD) mode and ordinary image-taking picture field size. The mark may be a part of an image-taking view field in a finder denoted by a hatched line region of FIG. 19. This region is in the image-taking region of the ordinary image-taking picture field size other than the image-taking region of the panorama (HD) mode. This region is shielded by a shielding portion that represents the image-taking region in the finder. Thus, when the user changes the ordinary image-taking picture field size mode to the panorama mode, he or she controls the framing while seeing this region. Thus, the region representing the ordinary image-taking region other than the image-taking region of the panorama (HD) mode (represented by the hatched line region shown in FIG. 19) can be used as such a mark.

When the view point position is present in the hatched line region shown in FIG. 17, the MPU 1 increments counter by 1. On the other hand, when the view position is not present in this region, the MPU 1 resets the counter to zero. The MPU 1 compares a numeric value CNT. of the counter with a predetermined constant CONST. When CNT.≧CONST. (namely, the number of times that the view point position is present in the hatched line region shown in FIG. 19 equals or exceeds a predetermined number, the MPU 1 enters a routine for changing the ordinary image-taking mode to the panorama (HD) mode. At this point, the MPU 1 resets the counter to zero. When CNT.<CONST. (namely, the number of times that view point position is present in the hatched line region shown in FIG. 19 does not equal and exceed the predetermined number), the MPU 1 returns to a routine for setting the image-taking picture field size.

The MPU 1 repeats this process until the image-taking picture field is set.

When the MPU 1 enters the routine for changing the ordinary image-taking picture field size mode to the panorama (HD) mode, the MPU 1 checks what image-taking picture field size has been set. When the ordinary image-taking picture field size mode has been set, the MPU 1 selects the panorama (HD) mode. Thus, the shielding plate is moved corresponding the panorama (HD) mode. In addition, MPU 1 shields upper and lower portions in the finder and lights up a Panorama mark in the finder.

On the other hand, when the panorama (HD) mode has been set, the MPU 1 selects the ordinary image-taking picture field size mode. Thus, the shielding plate is moved corresponding to the ordinary image-taking picture field mode. In addition, the upper and lower shielding portions in the finder and the Panorama mark disappear.

When necessary, the MPU 1 changes the image-taking picture field size corresponding to the output of the visual axis (until the SW1 is turned on by the release button and thereby the AF operation or the like is requested).

Next, the image-taking picture field size selection method using the outer switch will be described.

FIG. 20 is a block diagram showing constructional portions of the camera main body according to the tenth embodiment. In this drawing, reference numeral 1 is an MPU (Micro Processor Unit). Reference numeral 2 is a memory. Reference numeral 3 is a drive circuit for a CCD and an IRED (infrared ray emitting diode). Reference numeral 4 is a solid-state image pick-up device such as a CCD. Reference numeral 5 is an IRED array constructed of a plurality of IREDs. Reference numeral 6 is a lens drive unit for AF (Auto Focus) operation. Reference numeral 7 is an aperture drive unit. Reference numeral 8 is a shutter unit. Reference numeral 9 is an image-taking picture field size setting switch (panorama and ordinary size selector switch). Reference numeral 10 is an outer switch that sets the image-taking picture field size. In this embodiment, the drive circuit 3, the CCD 4, the IRED array 5, the MPU 1, and the memory 2 construct the visual axis detection means (see Japanese Patent Laid-Open Application No. 2-274736).

Figure 21:
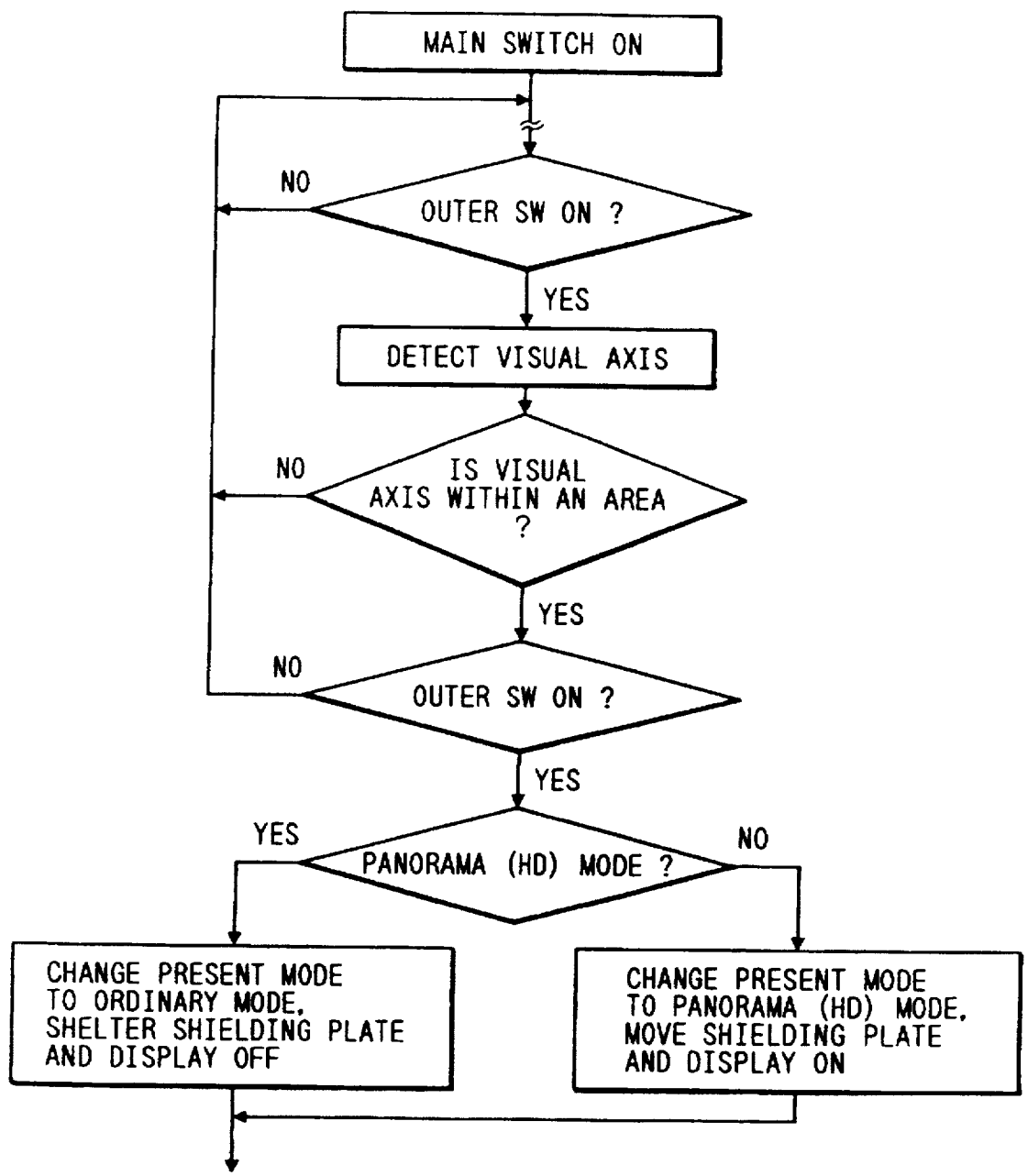
FIG. 21 is a flow chart illustrating an operation according to the tenth embodiment of the present invention.

FIG. 21 is a flow chart of the camera according to the tenth embodiment.

When the main switch is turned on, the MPU 1 progresses to a routine having a series of operations such as barrier releasing and displaying for preparation for image-taking. In the series of operations, the MPU 1 detects the visual axis of a user for setting an image-taking picture field size if an external switch therefor is set.

This is done in a following manner by utilizing a visual axis detection means. First, an initialization procedure is performed to initialize variables utilized in calculation and thereafter the MPU 1 sets the accumulation time of the CCD 4 taking into account whether glasses are worn or not and the intensity of the ambient light and the like.

At the same time, in response to the position (vertical position or horizontal position) of the camera indicated by a position sensor (not shown), a light emitting diode which should be turned on by taking into account whether glasses are worn or not can be selected, followed by the accumulation control step of the CCD 4. First, the MPU 1 instructs the CCD driver to execute a clear mode operation. The CCD driver which receives the instruction performs the clear operation to erase remaining electric charges in a memory zone of the CCD 4, a charge transfer line or the like.

Subsequently, the MPU 1 sends an IRED selective signal to the CCD driver in order to turn on the selected light emitting diode and sets the accumulation signal so as to be high level. This starts the accumulation synchronized with turning on the light emitting diode. Then, with the lapse of the predetermined accumulation time, the accumulation signal turns into a low level so that the accumulation terminates.

Next, the MPU 1 executes the extraction procedure of the optical image block (Purkinje image candidate) and the pupil's edge candidate.

First, the MPU 1 reads the image signal one line by one line from CCD by way of CCD driver successively, performs an A/D conversion and stores its value into the memory 2.

The extraction procedure of the optical image block (Purkinje image candidate) and the pupil's edge candidate will be done by utilizing the above data. The MPU 1 performs the above procedure with a predetermined number of lines designated in the read-out area of the CCD 4.

Namely, only the transfer operation is performed and the A/D conversion and the extraction operations are not performed as to the discarded top and bottom lines.

After completion of the above procedure as to all the read-out lines of CCD 4, the Purkinje image and the pupil's edge are detected. Then, the center and the radius of the pupil are calculated by utilizing the detected pupil's edge.

A method of least squares can be utilized, as disclosed, for example, in Japanese Patent Laid-Open Application No. 4-347131, to calculate the center and the radius of the pupil.

After that, the MPU 1 calculates a rotation angle of the eyeball and performs its correction due to individual difference, by utilizing positions of the Purkinje image and the center of the pupil, and finally calculates the position of the view point on a focusing screen of the camera.

When this view point is not present within the view point position range of the ordinary image-taking picture field size considering the display in the finder, the MPU 1 repeats the visual axis detecting operation.

When the view point position has been set by the visual axis detection means, the MPU 1 compares the view position with a size selection mark position of the panorama (HD) mode and ordinary image-taking screen size. The mark does not need to be especially provided therein. The mark may be a part of an image-taking view field in a finder denoted by a hatched line region of FIG. 19. This region is within the image-taking region of the ordinary image-taking picture field size and not within the image-taking region of the panorama (HD) mode. This region is shielded by a movable shielding portion to represent the image-taking region in the finder. Thus, when the user changes the ordinary image-taking picture field size mode to the panorama mode, the user ought to be conscious of the region and control framing or mode-changing while seeing this region. Accordingly, it is proper that the region representing the ordinary image-taking region rather than the image-taking region of the panorama mode (represented by the hatched line region shown in FIG. 19) can be used as such a mark.

Figure 19:
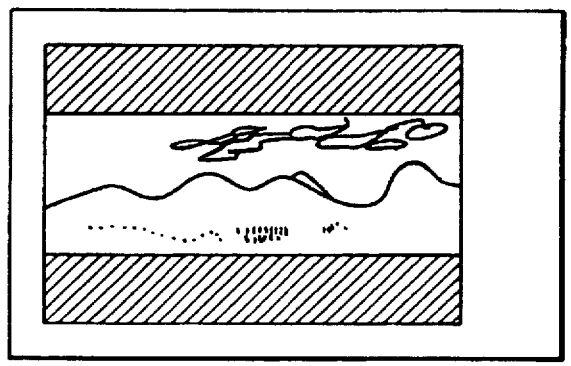
FIG. 19 is an explanatory view illustrating an indicium for changing a size of a picture field.

If the view point position is not present in the hatched line area shown in FIG. 19, the MPU 1 enters a routine for preparing the image-taking operation and waits for an operation that an outer switch that sets the image-taking picture field size is turned on. In contrast, when the view point position is present in the hatched line region, the MPU 1 examines whether the outer switch for setting the image-taking picture field size has been turned on. When the outer switch has been turned on, the MPU 1 advances to a routine for changing the ordinary image-taking mode to the panorama (HD) mode. When the outer switch is turned off, the MPU 1 returns to a routine for preparing the image-taking operation again and waits for an operation that the outer switch for setting the image-taking picture field size is turned on. Namely, when the outer switch is kept on for a predetermined time period (for example, several hundred milliseconds required for a visual axis detection), if the view point position of the user is present in the hatched line region shown in FIG. 19, the MPU 1 advances to a routine for changing the ordinary image-taking mode to the panorama (HD) mode.

When the MPU 1 enters the routine for changing the ordinary image-taking mode to the panorama (HD) mode, the MPU 1 checks what image-taking picture field size has been set. When the ordinary image-taking picture field size mode has been set, the MPU 1 changes this mode to the panorama (HD) mode. Thus, moving the shielding plate for the panorama (HD) mode and dispaly in a finder are executed. For example, upper and lower shielding portions in the finder appear and a Panorama mark blinks in the finder as the display. On the other hand, when the panorama (HD) mode has been set, the MPU 1 changes this mode to the ordinary image-taking picture field size mode. Thereafter, the shielding plate for the Panorama (HD) mode is moved corresponding to the ordinary image-taking mode. For example, the upper and lower shielding is released in the finder and the Panorama mark is lit off.

While the outer switch is on for setting the image-taking picture field size, the image-taking picture field size decided by using the output of the visual axis detection means is kept on changing.

Figure 15:
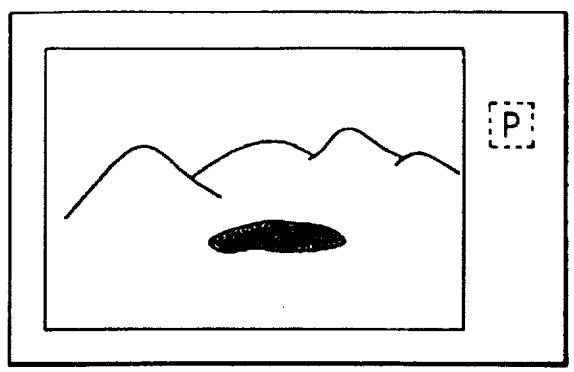
FIG. 15 is an explanatory view illustrating a mark character) for changing an ordinary mode and a panorama mode according to the eighth embodiment of the present invention.

In this embodiment, the mark represented by the hatched line region shown in FIG. 19 is used. However, even if the marks shown in FIGS. 15 and 17 are used, the image-taking picture field size can be changed by using the outer switch and the visual axis detection means at the same time. In this case, the same operation as the above-described embodiments can be employed.

Figure 22:
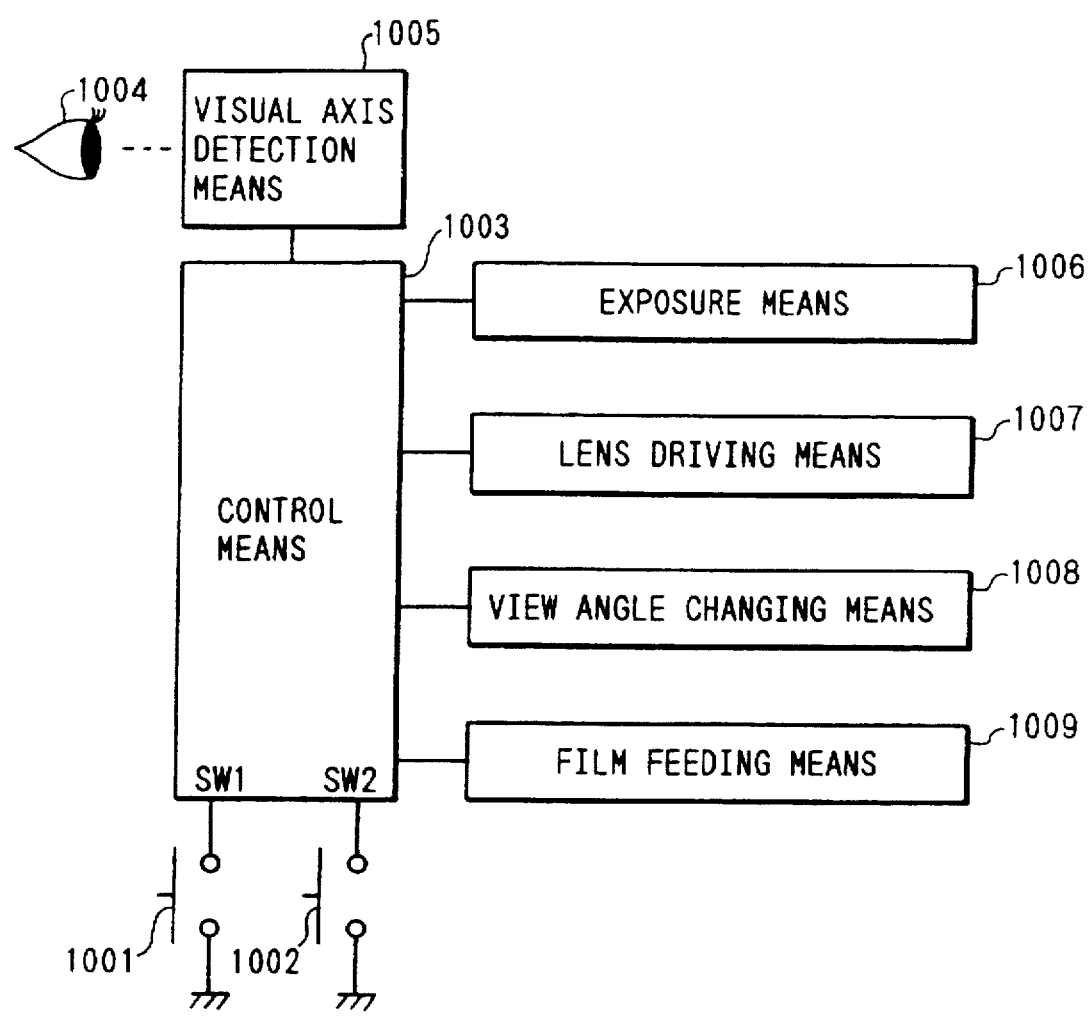
FIG. 22 is a block diagram illustrating the eleventh embodiment of the present invention.

FIG. 22 is a block diagram illustrating the eleventh embodiment of the present invention.

Herein numeral 1001 is the first switch (SW1) which is operated in cooperation with an unillustrated release button of a camera and is on by the first stroke. As the same manner, numeral 1002 is the second switch (SW2) which is operated in cooperation with an unillustrated release button of the camera and is on by the second stroke. Numeral 1003 is a control means for controlling the camera constructed by a microcomputer and the like. Numeral 1004 is an eye of a user (photographer). Numeral 1005 is means for detecting a position of a visual axis, which detects the user's visual axis and provides information indicating the position of the visual axis to the control means. Numeral 1006 is a film exposure means constructed by a shutter and the like. Numeral 1007 is lens driving means for changing a focal length of a lens. Numeral 1008 is means for changing over a full size and a panorama size which are picture field sizes. Numeral 1009 is means for feeding a film.

Figure 23:
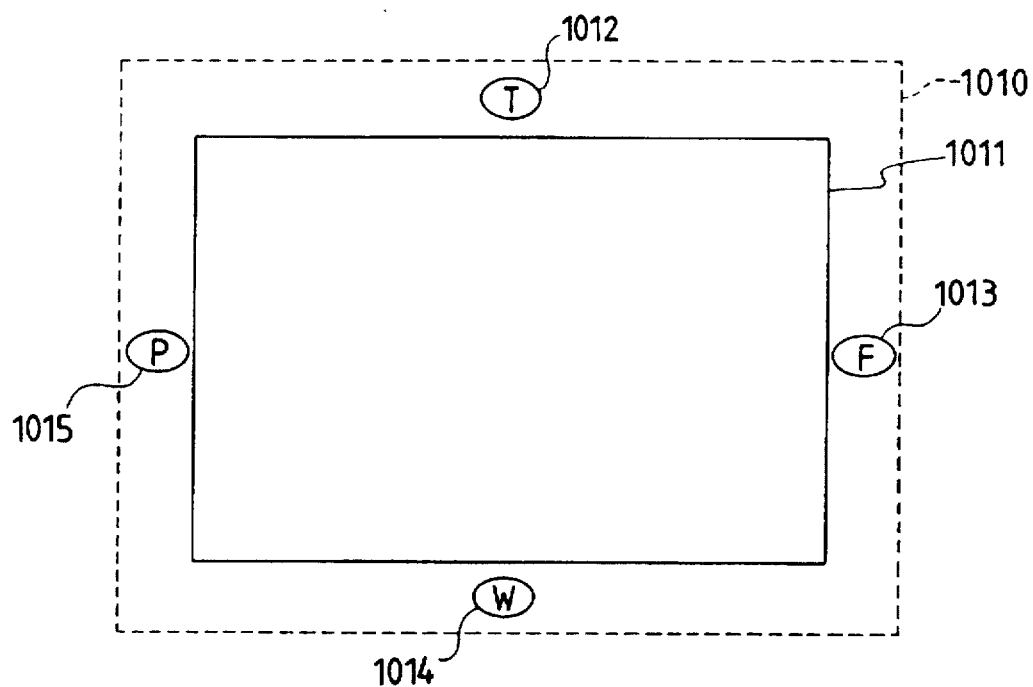
FIG. 23 is a view illustrating a display in a finder in the camera of the eleventh embodiment.

FIG. 23 is a view illustrating a display in a finder in the camera of the eleventh embodiment.

Herein a frame 1010 drawn by a dotted line is directed to an area which a user can view in the finder. A frame 1011 drawn by a solid line is directed to a phototaking frame, through which a film is imprinted.

Numerals 1012, 1013, 1014 and 1015 each is respectively a camera operation instructing mark. Numeral 1012 is a mark for instructing an operation for making a focal length of a phototaking lens of the camera longer (at the TELE end). Numeral 1014 is a mark for instructing an operation for making a focal length of a phototaking lens of the camera shorter (at the WIDE end). Numeral 1013 is a mark for instructing a mode for phototaking a film with a full size. Numeral 1015 is a mark for instructing a mode for phototaking a film with a panorama size.

Figure 25:
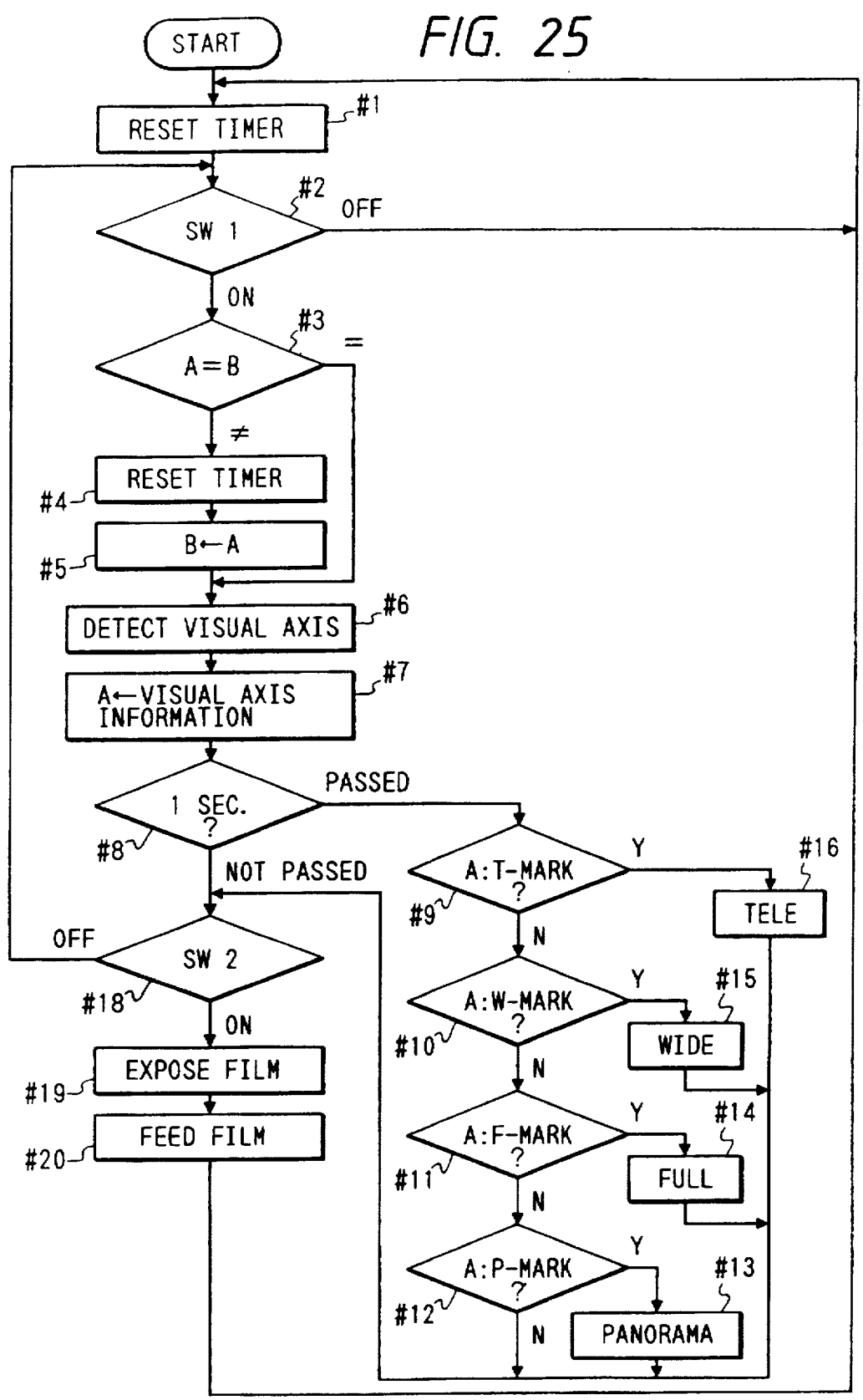
FIG. 25 is a flow chart illustrating a camera operation according to the eleventh embodiment of the present invention.

FIG. 25 is a flow chart illustrating a whole operation flow of the eleventh embodiment.

Herein an unillustrated time measuring device (which is hereinafter defined as "timer") is reset (at step #1) and thereafter judgement as to "ON" or "OFF" of SW1 is employed (at step #2).

At step #2, the release button of the camera is pushed. Thereafter if the first stroke is employed, then SW1 is "ON"

and advance is made to step #3. But if SW1 is "OFF", return is made to step #1.

At step #3, characters "A" and "B", each is directed to an unillustrated memory provided within control means 3. Hereby visual axis positional information is stored in the memories A and B. If information stored in a memory A is equal to that in a memory B, then advance is made to step #6. But if information stored in the memory A is not equal to that in a memory B, then advance is made to step #4 and thereafter a timer is reset and at step #5, an information of the memory B is rewritten to change the information into an information as to memory A. At steps #3, #4 and #5 in order, if a content of the memory A is finally changed to that of the memory B, then the timer is reset.

At step #6, a visual axis positional operation is employed and thereafter at step #7, the information as to the visual axis position is stored into the memory A.

At step #8, judgement as to whether one second has passed by the timer or not is employed. Herein if one second has passed thereby, then advance is made to step #9. However if one second has not passed thereby, then advance is made to step #18.

At step #9, if a visual axis positional information stored in the memory A is not equal to a positional information of T-mark 1012 in FIG. 23, then advance is made to step #10. However if a visual axis positional information stored in the memory A is equal to the positional information of T-mark 1012, then judgement is employed for confirmation that a user has gazed at the T-mark 1012 for one second or more and thereafter advance is made to step #16, the focal length of the phototaking lens is made so as to become longer by a predetermined length and further advance is made to step #17.

At step #10, if a visual axis positional information stored in the memory A is not equal to a positional information of W-mark 1014 in FIG. 23, then advance is made to step #11. However if a visual axis positional information stored in the memory A is equal to the positional information of W-mark 1014, then judgement is employed for confirmation that a user has gazed at the T-mark 1014 for one second or more and thereafter advance is made to step #15, the focal length of a phototaking lens is made so as to become shorter by a predetermined length and further advance is made to step #17.

At step #11, if a visual axis positional information stored in the memory A is not equal to a positional information of F-mark 1013 in FIG. 23, then advance is made to step #12. However if a visual axis positional information stored in the memory A is equal to the positional information of F-mark 1013, then judgement is employed for confirmation that a user has gazed at the F-mark 1013 for one second or more and thereafter advance is made to step #14. Thereat it is set so that a film is phototaken by full-size and further advance is made to step #18.

At step #12, if a visual axis positional information stored in the memory A is not equal to a positional information of P-mark 1015 in FIG. 23, then advance is made to step #18. However if a visual axis) positional information stored in the memory A is equal to the positional information of P-mark 1015, then advance is made to step #13. Thereat it is set so that a film is phototaken by panorama-size whereby an image-taking picture field size (phototaking field size) is changed and further advance is made to step #18.

At step #18, judgement is employed whether a switch SW2 is pushed or not. If a switch SW2 is OFF, then return to step #2. However if a switch SW2 is On, then advance is made to step #19. Thereat a film is exposed. Further at step #20, the film feeding is employed and return to step #1.

In FIG. 25, steps #19 and #20 are directed to a well-known operation for phototaking.

Additionally, variable zooming operation of the phototaking lens starts at a time when a user gazes at T-mark 1012 (or W-mark 1014) for one second or more. Further the focal length of the phototaking lens becomes longer (or shorter). In the way of the zooming, if the visual axis of the user is removed from T-mark (or W-mark), the present step advances from step #9 to step #10 whereby the zooming operation soon stops.

Figure 24:
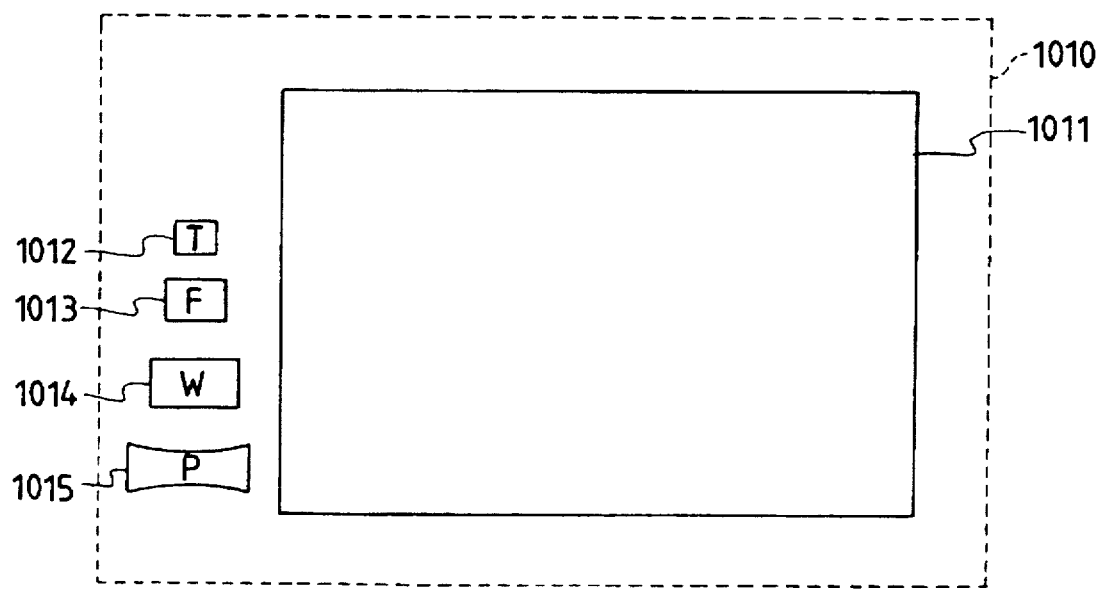
FIG. 24 is a view illustrating another embodiment of a display in a finder.

In the above-mentioned embodiment, camera operation instructing marks 1012, 1013, 1014 and 1015, each is respectively arranged outside of each of four sides of a frame for a phototaking view field. However, as illustrated in FIG. 24, camera operation marks 1012, 1013, 1014 and 1015 may be arranged at only outside of one side of the frame.

What is claimed is:

1. An image taking apparatus for forming an image of an object on a photosensitive member, said apparatus comprising:

observing means for observing said object, a mark being formed in a view field of said observing means;

detecting means for detecting whether or not a user has viewed the mark; and changing means for changing a size of an imaging surface of the photosensitive member when the user views the mark.

2. Apparatus according to claim 1, wherein said mark includes a character.

3. Apparatus according to claim 1, wherein a frame for viewing said image lies in said view field of said observing means and said mark is provided in said frame.

4. Apparatus according to claim 1, wherein a plurality of marks are provided in said view field of said observing means, and wherein said detecting means detects the user viewing each of said plurality of marks.

5. Apparatus according to claim 4, wherein said plurality of marks includes a zoom mark for zooming said image, and further comprising means for zooming said image when the user views said zoom mark.

6. Apparatus according to claim 4, wherein said plurality of marks includes a first mark for changing said size of said image receiving area to a maximum size and a second mark for changing said size of said imaging surface to a panorama size.

7. Apparatus according to claim 6, wherein said first mark and said second mark each include a character.

8. Apparatus according to claim 6, wherein a frame for viewing said image lies in said view field of said observing means, and wherein said first mark and said second mark are disposed outside of said frame.

9. Apparatus according to claim 8, wherein said first mark and said second mark are spaced apart.

10. Apparatus according to claim 9, wherein a third mark is provided between said first mark and said second mark.

11. Apparatus according to claim 9, wherein said first mark and said second mark are disposed on different size of said frame.

12. Apparatus according to claim 11, wherein said first mark and said second mark are disposed on opposite sides of said frame.

13. An image taking apparatus for forming an image of an object on a photosensitive member, said apparatus comprising:

detecting means for detecting a direction of view of a user; and changing means for changing a size of an imaging surface of said photosensitive member according to an output of said detecting means.

14. Apparatus according to claim 13, further comprising observing means for observing said object, wherein said changing means changes the size of said imaging surface when said user views a portion within a view field of said observing means.

15. Apparatus according to claim 14, wherein a frame for viewing said image lies in said view field of said observing means, and wherein said portion lies on the frame.

16. Apparatus according to claim 15, wherein said portion includes an index.

17. Apparatus according to claim 14, wherein a mark is provided in said view field of said observing means, and wherein said changing means changes said size of said imaging portion when said user views said mark.

18. Apparatus according to claim 17, wherein said mark includes a character.

19. Apparatus according to claim 17, wherein first and second marks are provided in the view field of said observing means, and wherein said changing means changes said size of said imaging surface when said user views either the first mark or the second mark.

20. Apparatus according to claim 19, wherein said first mark comprises a mark for changing said size of said imaging surface to a full size, and wherein said second mark is a mark for changing said size of said imaging surface to a panorama size.

21. Apparatus according to claim 20, wherein said first mark and said second mark each have a character.

22. Apparatus according to claim 20, wherein said first mark and said second mark are disposed outside of said frame.

23. Apparatus according to claim 22, wherein said first mark and said second mark are spaced apart.

24. Apparatus according to claim 23, wherein a third mark is disposed between said first mark and said second mark.

25. Apparatus according to claim 23, wherein said first mark and said second mark are disposed on different sides of said frame.

26. Apparatus according to claim 25, wherein said first mark and said second mark are disposed on opposite sides of said frame.

27. Apparatus according to claim 19, wherein a third mark is provided in said view field of said observing means for zooming said image, and further comprising means for zooming said image when said user views said third mark.

28. An optical apparatus for forming an image of an object on a photosensitive member, said apparatus comprising:

observing means for observing said object, a mark being formed in a view field of said observing means;

changing means for changing a size of an imaging surface of the photosensitive member; and detecting means for detecting a direction of a visual axis of a user;

control means for discriminating whether or not said user has viewed said mark by using an output of said detecting means, and for controlling said changing means according to the discrimination result.

29. Apparatus according to claim 28, wherein said mark includes a character.

30. Apparatus according to claim 28, wherein a plurality of marks are provided in the view field of said observing means, and wherein said control means detects when the viewer views each of said plurality of marks.

31. Apparatus according to claim 30, wherein the plurality of marks includes a first mark for changing size of said imaging surface to a full size, and a second mark for changing said size of said imaging surface to a panorama size.

32. Apparatus according to claim 31, wherein said plurality of marks includes a third mark for zooming said image, and wherein said apparatus further comprises means for zooming said image when said viewer views said third mark.

33. Apparatus according to claim 31, wherein said first mark and said second mark each include a character.

34. Apparatus according to claim 31, wherein a frame for viewing said image lies in said view field of said observing means, and wherein said first mark and said second mark are disposed outside of said frame.

35. Apparatus according to claim 34, wherein said first mark and said second mark are disposed spaced apart.

36. Apparatus according to claim 35, wherein a third mark is provided between said first mark and said second mark.

37. Apparatus according to claim 35, wherein said first mark and said second mark are disposed on different sides of said frame.

38. Apparatus according to claim 37, wherein said first mark and said second mark are disposed on opposite sides of said frame.

39. An optical apparatus for forming an image of an object on a photosensitive member, said apparatus comprising:

changing means for changing a size of an imaging surface of said photosensitive member;

detecting means for detecting a direction of a visual axis of a user; and control means for controlling said changing means according to an output of said detecting means.

40. Apparatus according to claim 39, further comprising observing means for observing said object, a mark being formed in a view field of said observing means, wherein a mark is provided in the view field of said observing means, and wherein said changing means changes said size of said imaging surface when said visual axis is directed to said mark.

41. Apparatus according to claim 40, wherein said mark includes a character.

42. Apparatus according to claim 40, wherein a frame for viewing said image lies in said view field of said observing means, and wherein said mark is disposed in said frame.

43. Apparatus according to claim 40, wherein a plurality of marks are provided in said view field of said observing means, said plurality of marks including a first mark and a second mark, and wherein said changing means changes said size of said imaging surface when said visual axis is directed to said first mark or to said second mark.

44. Apparatus according to claim 43, wherein said first mark is for changing said size of said imaging surface to a full size, and wherein said second mark is for changing said size of said imaging surface to a panorama size.

45. Apparatus according to claim 44, wherein said first mark and said second mark each include a character.

46. Apparatus according to claim 44, wherein a frame for viewing said image lies in said view field of said observing means, and wherein said first mark and said second mark are disposed outside of said frame.

47. Apparatus according to claim 46, wherein said first mark and said second mark are disposed spaced apart.

48. Apparatus according to claim 37, wherein a third mark is disposed between said first mark and said second mark.

49. Apparatus according to claim 48, wherein said first mark and said second mark are disposed on different sides of said frame.

50. Apparatus according to claim 49, wherein said first mark and said second mark are disposed on opposite sides of said frame.

51. Apparatus according to claim 43, wherein said plurality of marks includes a third mark for zooming said image, and wherein said apparatus further comprising means for zooming said image when said visual axis is directed to said third mark.

* * * * *

UNITED STATES PATENT AND TRADEMARK OFFICE
CERTIFICATE OF CORRECTION

PATENT NO. : 5,790,192

DATED : August 4, 1998

INVENTORS : KAZUKI KONISHI, ET AL.

It is certified that error appears in the above-identified patent and that said Letters Patent is hereby corrected as shown below:

ON THE COVER PAGE

Under item [56], "References Cited", "FOREIGN PATENT DOCUMENTS", "5183798" should read --5-183798--.

COLUMN 1:

Line 35, "fake" should read --take--;
Line 45, "single" should read --a single--; and
Line 49, "in a" should read --in--.

COLUMN 2:

Line 66, "a HD " should read --an HD--.

COLUMN 3:

Line 37, "character)" should read --(character)--.

COLUMN 4:

Line 12, "i s" should read --is--.

UNITED STATES PATENT AND TRADEMARK OFFICE
CERTIFICATE OF CORRECTION

PATENT NO. : 5,790,192

DATED : August 4, 1998

INVENTORS : KAZUKI KONISHI, ET AL.

It is certified that error appears in the above-identified patent and that said Letters Patent is hereby corrected as shown below:

COLUMN 5:

Line 19, "manner" should read --a manner-- and "a bottom" should read --bottom--; and
　　　Line 39, "outer" should read --the ambient--.

COLUMN 8:

Line 24, "circuit" should read --circuit 10--.

COLUMN 9:

Line 56, "readout" should read --read-out--.

COLUMN 15:

Line 61, "avoided" should read --prevented--.

COLUMN 18:

Line 7, "outer" should read --the ambient--.

UNITED STATES PATENT AND TRADEMARK OFFICE
CERTIFICATE OF CORRECTION

PATENT NO. : 5,790,192

DATED : August 4, 1998

INVENTORS : KAZUKI KONISHI, ET AL.

It is certified that error appears in the above-identified patent and that said Letters Patent is hereby corrected as shown below:

COLUMN 19:

Line 66, "image" should read --an image--.

COLUMN 20:

Line 21, "operate" should read --operate an--.

COLUMN 22:

Line 3, "CNT.>CONST." should read --CNT.$\geq$CONST.--.

COLUMN 23:

Line 39, "been" should read --has been--.

COLUMN 27:

Line 18, "difference," should read --differences,--.

UNITED STATES PATENT AND TRADEMARK OFFICE
CERTIFICATE OF CORRECTION

PATENT NO. : 5,790,192

DATED : August 4, 1998

INVENTORS : KAZUKI KONISHI, ET AL.

It is certified that error appears in the above-identified patent and that said Letters Patent is hereby corrected as shown below:

COLUMN 29:

Line 53, "axis)" should read --axis--; and
Line 63, "return" should read --return is made--.

COLUMN 31:

Line 44, "member; and" should read --member;--; and
Line 46, "user;" should read --user; and--.

Signed and Sealed this

Eleventh Day of May, 1999

Attest:

Q. TODD DICKINSON

Attesting Officer

Acting Commissioner of Patents and Trademarks